(12) United States Patent
Koide

(10) Patent No.: US 7,131,730 B2
(45) Date of Patent: Nov. 7, 2006

(54) ILLUMINATION OPTICAL SYSTEM AND PROJECTION DISPLAY OPTICAL SYSTEM

(75) Inventor: Jun Koide, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/409,287

(22) Filed: Apr. 21, 2006

(65) Prior Publication Data

US 2006/0197926 A1 Sep. 7, 2006

Related U.S. Application Data

(63) Continuation of application No. 10/774,812, filed on Feb. 9, 2004.

(30) Foreign Application Priority Data

Feb. 12, 2003 (JP) ............................. 2003-034422

(51) Int. Cl.
G03B 21/14 (2006.01)
G03B 21/20 (2006.01)
G02F 1/1335 (2006.01)

(52) U.S. Cl. ..................... 353/20; 353/69; 353/97; 353/102; 349/9

(58) Field of Classification Search ............. 353/20, 353/30, 31, 69, 97, 102; 359/267, 487; 355/67; 349/5, 7, 9
See application file for complete search history.

(56) References Cited

U.S. PATENT DOCUMENTS

| 4,682,885 A | 7/1987 | Torigoe |
| 6,285,440 B1 | 9/2001 | Takahashi |
| 6,337,759 B1 | 1/2002 | Yamamoto |
| 6,373,629 B1 | 4/2002 | Yamagishi et al. |
| 2001/0033418 A1 | 10/2001 | Hayashi |
| 2002/0140905 A1 | 10/2002 | Ouchi et al. |

FOREIGN PATENT DOCUMENTS

| JP | 11(1999)-64848 | 3/1999 |
| JP | 2000-180813 | 6/2000 |
| JP | 2001-176766 | 6/2001 |
| JP | 3473075 | 9/2003 |
| JP | 2004-045907 | 2/2004 |
| JP | 3529578 | 3/2004 |
| JP | 3666504 | 4/2004 |
| JP | 3666505 | 4/2004 |
| JP | 2004-233442 | 8/2004 |

OTHER PUBLICATIONS

EPO Search Report issued May 24, 2004 for counterpart application EP 04250737.
Chinese Office Action, Jul. 11, 2005, w/English Translation of Examiner's Comments in Chinese Office Action.

(Continued)

Primary Examiner—Melissa Jan Koval
(74) Attorney, Agent, or Firm—Morgan & Finnegan, LLP

(57) ABSTRACT

An illumination optical system which can use light from a light source with high efficiency and can provide an illumination luminous flux with highly uniform illuminance, is disclosed. The illumination optical system illuminates an illumination surface with a generally telecentric illumination luminous flux. In light intensity distribution of illumination light on the illumination surface changing depending on a deviation angle of an incident ray with respect to a normal to the illumination surface, the illumination optical system operates the illumination luminous flux such that a ratio of angle widths at which light intensity reaches half of a peak value in each of two axis directions orthogonal to each other on the illumination surface is an aspect ratio of 2:1.

6 Claims, 15 Drawing Sheets

OTHER PUBLICATIONS

English language Abstract, claims and partial translation of specification of Japan for Publication No. 2004-045907, Feb. 12, 2004.
English language Abstract, claims and partial translation of specification of Japan for Publication No. 2004-233442, Aug. 19, 2004.
English language Abstract, claims and partial translation of specification of Japan for Publication No. 2000-180813, Jun. 30, 2000.
English language Abstract, claims and partial translation of specification of Japan for Publication No. 07-181392, Jul. 21, 1995 for Patent No. 3473075, Issued Sep. 19, 2003.

English language Abstract, claims and partial translation of specification of Japan for Publication No. 10-246868, Sep. 19, 1998 for Patent No. 3529578, Issued Mar. 5, 2004.
English language Abstract, claims and partial translation of specification of Japan for Publication No. 2004-310130, Nov. 4, 2004 for Paten tNo. 3666504, Issued Apr. 15, 2005.
English language Abstract, claims and partial translation of specification of Japan for Publication No. 2004-295150, Oct. 21, 2004 for Patent No. 3666505, Issued Apr. 15, 2005.

(A)

SPLITTING AND OPTICAL INTEGRATION DIRECTION (B)

RAY DENSITY DISTRIBUTION AT POSITION OF LIGHT MODULATION PANEL SURFACE (C)

(A)

(B)

(C)

ILLUMINATION OPTICAL SYSTEM AND PROJECTION DISPLAY OPTICAL SYSTEM

This is a continuation of co-pending application Ser. No. 10/774,812, filed Feb. 9, 2004.

BACKGROUND OF THE INVENTION

1. Field of the Invention

The present invention relates to an illumination optical system and a projection display optical system which are used in a projection type image display apparatus.

2. Description of Related Art

Conventionally, in a projector type display (a projection type image display apparatus), a liquid crystal display panel or a micromirror array device panel is typically used as a light modulation element for switching to control transmission and shielding or deflection of light to project a selected light pattern onto a screen, thereby displaying an image on the screen.

In the projector which employs the liquid crystal display panel or the micromirror array device panel as the light modulation element, it is important to use light from a light source with high efficiency and reduce variations in illuminance on the screen.

An optical integrator formed of two lens arrays each including lenses arranged two-dimensionally is a known means for improvement. In the optical integrator, a first lens array splits a luminous flux from a light source into a plurality of luminous fluxes, and a second lens array enlarges the luminous fluxes and forms images by the luminous fluxes superimposed one on another on a display area of a light modulation element (see Japanese Patent Application Laid-Open No. 11(1999)-64848).

In this method, since the split luminous fluxes with small variations in illuminance are superimposed, the resulting irradiation light has high uniformity to significantly reduce variations in illuminance on the screen. When the first lens array has each aperture formed in a rectangular shape similar to the display area of the light modulation element, all the split luminous fluxes are irradiated to the display area without waste. This improves the efficiency of the irradiation light and thus improves the use efficiency of the light from the light source.

Another means for improvement is to guide light from a light source to a kaleidoscope to mix the vectors of light rays to provide uniform light intensity distribution at an end surface of the kaleidoscope from which the light emerges, and then form a conjugate image by an image-forming lens on a micromirror array device used as a light modulation element.

When the kaleidoscope is used, an optical system is complicated if a means for converting natural emission light from the light source into linearly polarized light is used. Thus, such a means is not used generally.

In the method, the resulting irradiation light has high uniformity to significantly reduce variations in illuminance on a screen.

However, in the method of providing uniform light intensity distribution using the optical integrator formed of two lens arrays or the kaleidoscope, the luminous flux illuminating the light modulation element has a large convergent angle. When the light modulation panel is realized by a reflection type liquid crystal display panel or a micromirror array device, limitations are imposed on space for forming an optical path along which the illumination light is guided. When a TIR prism is used to guide light, the minimum angle of total reflection is limited. When a polarization beam splitter is used to guide light, limitations are imposed due to dependency of the reflectivity of S waves on the incident angle. From these facts, the illumination luminous flux incident on the light modulation element is desirably close to a collimated luminous flux.

In addition, when a transmission type liquid crystal display panel is used as the light modulation element to modulate light of tree primary colors of red, green, and blue, the modulated light components are then combined by a dichroic mirror or dichroic prism. In this case, as the modulated light is less similar to a collimated luminous flux, the cut wavelength in a reflection/transmission wavelength region of a dichroic film is changed to produce turbidity of colors or variations in color reproducibility depending on the position of a projected image.

When twisted nematic liquid crystal (TNLC) is used as the light modulation element, whether it is of a transmission type or a reflection type, as the incident angle of an illumination luminous flux on the liquid crystal display panel is more inclined with respect to the normal to the panel, and more inclined with respect to the rubbing direction of liquid crystal molecules in the liquid crystal display panel plane, a larger deviation occurs from 0 or $\pi$ which is an ideal phase difference of a wave provided by transmission through the liquid crystal display panel. Therefore, contrast in light modulation is reduced.

SUMMARY OF THE INVENTION

It is an object of the present invention to provide an illumination optical system which can use light from a light source with high efficiency and can provide an illumination luminous flux with highly uniform illuminance, and a projection display optical system and a projection type image display apparatus which can achieve a projected image with a higher brightness and a higher contrast.

To achieve the aforementioned objects, according to one aspect, the present invention provides an illumination optical system which illuminates an illumination surface with a generally telecentric illumination luminous flux (which means that it includes somewhat divergent and convergent components), wherein the illumination optical system optically operates the illumination luminous flux such that, in intensity distribution of illumination light on the illumination surface changing depending on a deviation angle of an incident ray with respect to the normal to the illumination surface, a ratio of angle widths at which light intensity reaches half of a peak value in each of two axis directions orthogonal to each other on the illumination surface is an aspect ratio of 2:1 or higher.

According to second aspect, the present invention provides an illumination optical system which optically operates an illumination luminous flux incident as a generally collimated luminous flux (which means that it includes somewhat divergent and convergent components), comprising an optical integrator and a light intensity conversion element. The optical integrator performs splitting and recombination on a luminous flux in a first axis direction on a section generally orthogonal to the traveling direction of the illumination luminous flux. The light intensity conversion element performs conversion of light intensity distribution of the illumination luminous flux in a second axis direction orthogonal to the first axis direction on the section.

According to third aspect, the present invention provides a projection display optical system comprising the illumination optical system, a spatial light modulation element which modulates a luminous flux emerging from the illumination optical system by a group of pixels arranged two-dimensionally, and a projection lens which projects the luminous flux modulated by the spatial light modulation element onto a projection surface.

These and other characteristics of the present invention will be apparent from the following description of specific embodiments with reference to the drawings.

DETAILED DESCRIPTION OF THE PREFERRED EMBODIMENTS

Embodiment 1

Figure 1:
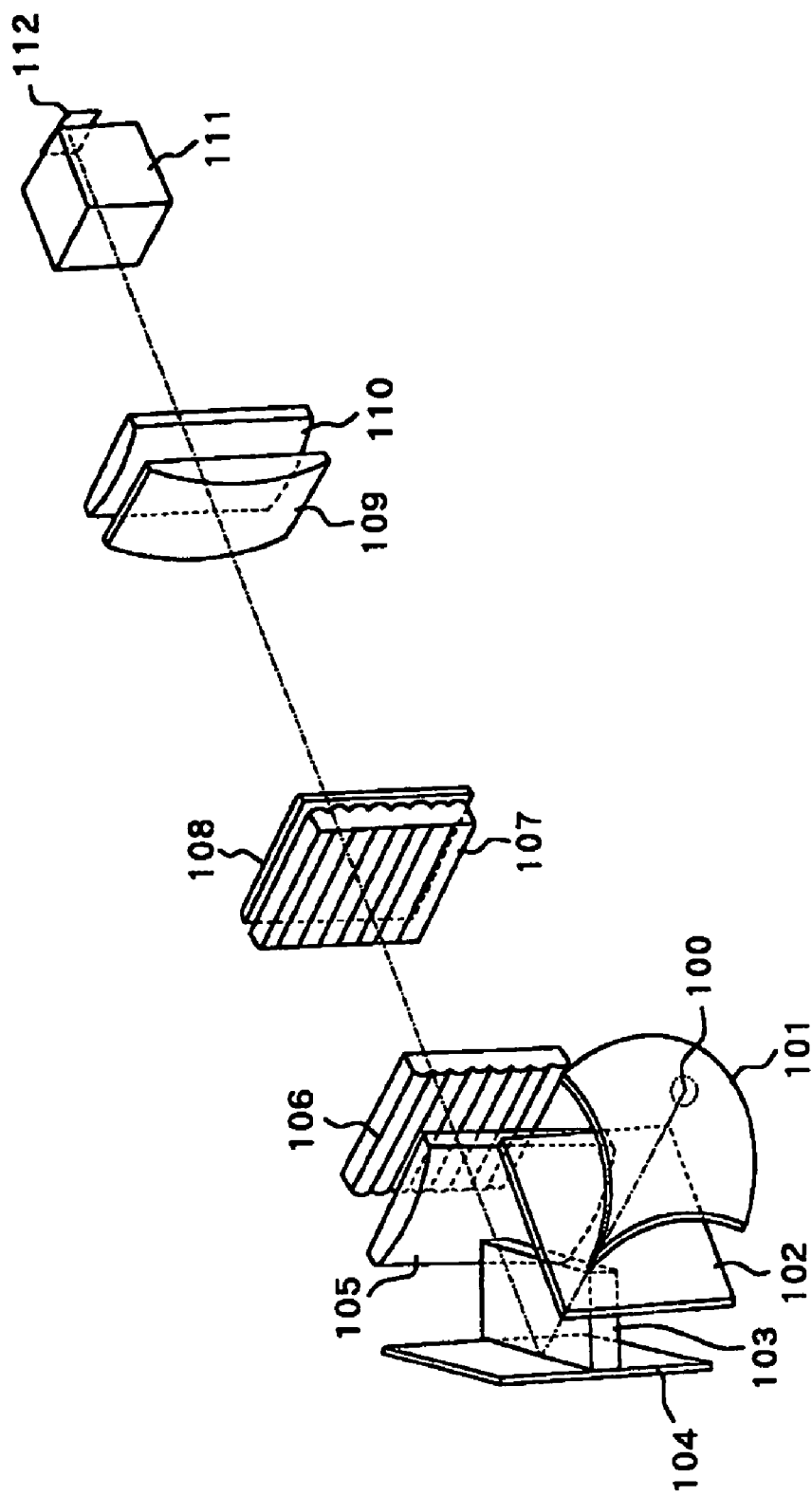
FIG. 1 schematically shows the structure of an illumination optical system which is Embodiment 1 of the present invention.

FIG. 1 shows the structure of an illumination optical system which is Embodiment 1 of the present invention. In FIG. 1, reference numeral 100 shows a gas exciting light emission source serving as a light source. As the light source 100, a high-pressure mercury lamp, a metal halide lamp, a xenon lamp or the like is used.

The light source 100 is used in combination with a parabolic reflecting mirror 101 to produce a generally collimated visible light beam. To provide a high-quality collimated luminous flux with the smallest possible divergence (the smallest possible divergence angle), a minimized discharge gap is designed to limit an electron excited area in a gas, and the light source 100 emits light close to that emitted by a point source of light.

To make the light emission source closer to a point source, instead of applying an AC bias to the discharge gap to emit electrons from both directions of electrodes to form two point sources of light, a DC bias may be applied to produce a point source of light with high luminance on the side of a cathode while the efficiency of light emission and the efficiency of energy conversion are reduced.

Of the luminous flux emitted from a lamp unit formed of the gas exciting light source 100 and the parabolic reflecting mirror 101, ultraviolet rays outside visible light are cut by an ultraviolet ray cut filter 102. The ultraviolet rays excite or degrade optical glass used as a material of a lens or an optical thin film in the long term. However, a major purpose of the ultraviolet ray cut filter 102 is to prevent the ultraviolet rays from decomposing and altering a liquid crystal polymer which is an organic material when a liquid crystal element is used for a light modulation panel.

The luminous flux of visible light transmitted through the ultraviolet ray cut filter 102 is then incident on a shuffling prism 103 and a reflecting mirror 104 which serve as light intensity conversion elements disposed in a predetermined area of the luminous flux, and deflected and reflected. The shuffling prism 103 used in this case has a shape provided by folding an opposite apical angle prism on a reflecting surface of the reflecting mirror 104. The effects of the shuffling prism 103 are later described with reference to FIG. 4.

Then, the luminous flux transmitted through the shuffling prism 103 and reflected by the reflecting mirror 104 is incident on a first cylindrical lens 105. The first cylindrical lens 105 has a refractive power only in a horizontal direction in FIG. 1, and forms a beam compressor as a pair with a second cylindrical lens 110 disposed in a direction in which the luminous flux travels.

Thus, the luminous flux incident on the first cylindrical lens 105 is compressed in the horizontal direction in FIG. 1, and is guided to a light modulation panel 112 in the afocal state.

The luminous flux transmitted through the first cylindrical lens 105 is incident on a first cylindrical array homogenizer 106. The first cylindrical array homogenizer 106 is formed of an array of lenses having a refractive power only in a vertical direction in FIG. 1. The first cylindrical array homogenizer 106 splits the incident luminous flux into a plurality of luminous fluxes, the number of which is equal to the number of the lenses of the array, and focal lines are individually formed, and then a cylindrical condenser lens 109 converts the luminous fluxes into collimated luminous fluxes set to have a predetermined width.

The spacing between the principal planes of the first cylindrical array homogenizer 106 and the cylindrical condenser lens 109 is set to the sum of the focal length of the first cylindrical array homogenizer 106 and the focal length of the cylindrical condenser lens 109. This causes the luminous fluxes to be converted into collimated luminous fluxes as described above.

Since the first cylindrical array homogenizer 106 has an optical axis line decentered with respect to an optical axis line of each lens of the array, the cylindrical condenser lens 109 superimposes the luminous fluxes transmitted through the respective lenses of the array of the first cylindrical array homogenizer 106 at the position of a focal line of the cylindrical condenser lens 109. This achieves an optical integration (split and recombination of the luminous fluxes) operation.

The position of the focal line of the cylindrical condenser lens 109 corresponds to a modulation surface of the light modulation panel (spatial light modulation element) 112.

The positions of focal lines of a second cylindrical array homogenizer 107 are set to the positions of pupils of the respective lenses of the array of the first cylindrical array homogenizer 106. The tandem lens structure of the second cylindrical array homogenizer 107 and the cylindrical condenser lens 109 results in an optically conjugate relationship between the pupils of the respective lenses of the array of the first cylindrical array homogenizer 106 and the modulation surface of the light modulation panel 112. Consequently, the pupils of the respective lenses of the array of the first cylindrical array homogenizer 106 are imaged on the modulation surface of the light modulation panel 112 in the vertical direction in FIG. 1.

The luminous flux emitted from the lamp unit formed of the gas exciting light source 100 and the parabolic reflecting mirror 101 is not completely collimated and has slight divergence. The second cylindrical array homogenizer 107 corrects the divergence of the luminous flux to reliably guide the luminous flux transmitted through the pupil of each lens of the array of the first cylindrical array homogenizer 106 to the modulation surface of the light modulation panel 112.

The luminous fluxes transmitted through the second cylindrical array homogenizer 107 are incident on a polarization conversion element array 108. The polarization conversion element array 108 used in this case is similar to that called a PS conversion element which is generally used in a liquid crystal projector. The polarization conversion element 108 changes the light emitted from the lamp unit into polarized light components in parallel with one direction, for example with the vertical direction in FIG. 1, by an array of polarization beam splitters.

Specifically, the polarization conversion element array 108 transmits light components polarized in the vertical direction in FIG. 1 through a polarization splitting film (not shown) and reflects light components polarized in the horizontal direction in FIG. 1 by the polarization splitting film, and the reflected light components are again reflected by a polarization splitting film of the adjacent polarization beam splitter of the array to shift the optical path by a pitch in the array. The polarization direction of the light is changed 90 degrees by a half-wave plate (not shown) immediately before emerging from the polarization light conversion element array 108, and then the light emerges as linearly polarized light in the vertical direction in FIG. 1. In this manner, all luminous fluxes transmitted through the polarization conversion element array 108 become linearly polarized light in the vertical direction in FIG. 1.

The luminous fluxes transmitted through the polarization conversion element array 108 are incident on the cylindrical condenser lens 109, and superimposed with each other in the vertical direction in FIG. 1 for integration on the modulation surface of the light modulation panel 112 located at the position of the focal line of the cylindrical condenser lens 109.

The luminous fluxes transmitted through the cylindrical condenser lens 109 are incident on the second cylindrical lens 110. The cylindrical lens 110 has a refractive power only in the horizontal direction in FIG. 1 and forms the beam compressor as a pair with the first cylindrical lens 105 as described above. Thus, the luminous fluxes are compressed in the horizontal direction in FIG. 1 and guided to the light modulation panel 112 in the afocal state.

The second cylindrical lens 110 is arranged to dispose a pupil of the first cylindrical lens 105 and the modulation surface of the light modulation panel 112 in an optically conjugate relationship. The pupil of the first cylindrical lens 105 is imaged on the modulation surface of the light modulation panel 112 in the horizontal direction in FIG. 1.

The second cylindrical lens 110 is provided for correcting the divergence of the luminous flux emitted from the lamp unit formed of the gas exciting light source 100 and the parabolic reflecting mirror 101 to reliably guide the luminous flux transmitted through the pupil of the first cylindrical lens 105 to the modulation surface of the light modulation panel 112, similarly to the cylindrical array homogenizer 107 described above.

The luminous fluxes transmitted through the cylindrical lens 110 are incident on a dummy polarization beam splitter 111. The dummy may be formed of a dichroic prism or mirror instead. Whether the dummy is formed of a polarization beam splitter or a dichroic prism, the deflection direction of the luminous fluxes is set to the horizontal direction in FIG. 1.

As described above, the luminous fluxes transmitted through the illumination optical system of Embodiment 1 are guided to the light modulation panel 112. The illumination characteristics of Embodiment 1 are later described.

Embodiment 2

Figure 2:
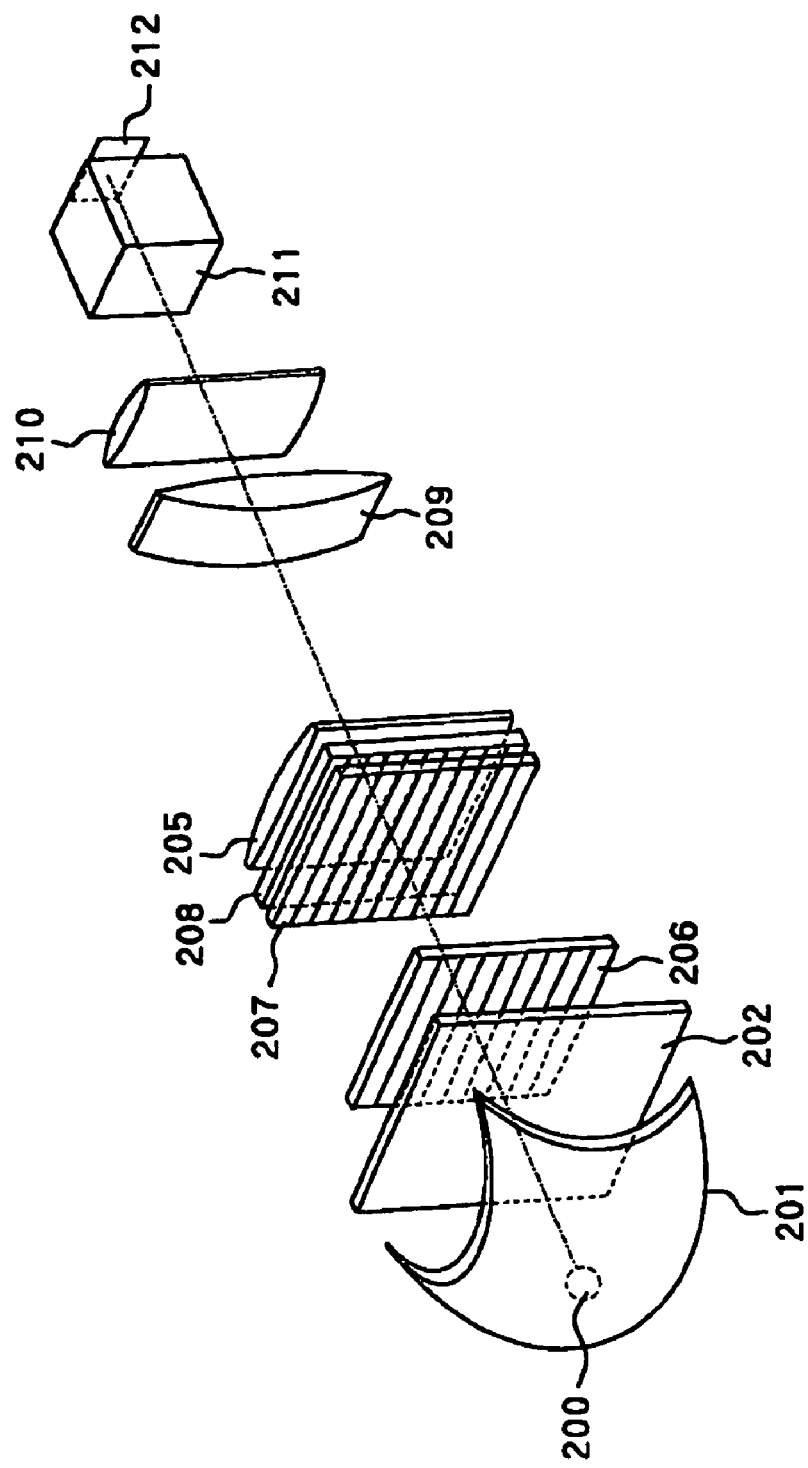
FIG. 2 schematically shows the structure of an illumination optical system which is Embodiment 2 of the present invention.

FIG. 2 shows the structure of an illumination optical system which is Embodiment 2 of the present invention. In FIG. 2, reference numeral 200 shows a gas exciting light emission source serving as a light source. As the light source 200, a high-pressure mercury lamp, a metal halide lamp, a xenon lamp or the like is used. The light source 200 is used in combination with a parabolic reflecting mirror 201 to produce a generally collimated visible light beam. To provide a high-quality collimated luminous flux with the smallest possible divergence (the smallest possible divergence angle), the light source 200 is designed to have a minimized discharge gap to limit an electron excited area in a gas, and the light source 200 emits light close to that emitted by a point source of light.

To make the light emission source closer to a point source of light, instead of applying an AC bias to the discharge gap to emit electrons from both directions of electrodes to form two point sources of light, a DC bias may be applied to produce a point source of light with high luminance on the side of a cathode while the efficiency of light emission and the efficiency of energy conversion are reduced.

Of the luminous flux emitted from a lamp unit formed of the gas exciting light source 200 and the parabolic reflecting mirror 201, ultraviolet rays outside visible light are cut by an ultraviolet ray cut filter 202. The ultraviolet rays excite or degrade optical glass used as a material of a lens or an optical thin film in the long term. However, a major purpose of the ultraviolet ray cut filter 202 is to prevent the ultraviolet rays from decomposing and altering a liquid crystal polymer which is an organic material when a liquid crystal element is used for a light modulation panel.

Next, the luminous flux of visible light transmitted through the ultraviolet ray cut filter 202 is incident on a first cylindrical array homogenizer 206. The first cylindrical array homogenizer 206 has a refractive power only in a vertical direction in FIG. 1. The first cylindrical array homogenizer 206 splits the incident luminous flux into a plurality of luminous fluxes, the number of which is equal to the number of lenses of the array, and focal lines are individually formed, and then a cylindrical condenser lens 209 converts the luminous fluxes into collimated luminous fluxes set to have a predetermined width.

The spacing between the principal planes of the first cylindrical array homogenizer 206 and the cylindrical condenser lens 209 is set to the sum of the focal length of the first cylindrical array homogenizer 206 and the focal length of the cylindrical condenser lens 209. This causes the luminous fluxes to be converted into collimated luminous fluxes as described above.

Since the first cylindrical array homogenizer 206 has an optical axis line decentered with respect to an optical axis line of each lens of the array, the cylindrical condenser lens 209 superimposes the luminous fluxes transmitted through the respective lenses of the array of the first cylindrical array homogenizer 206 at the position of a focal line of the cylindrical condenser lens 209. This achieves an optical integration operation. The position of the focal line of the cylindrical condenser lens 209 corresponds to a modulation surface of a light modulation panel 212.

The luminous fluxes transmitted through the first cylindrical array homogenizer 206 are transmitted through a second cylindrical array homogenizer 207. The positions of focal lines of the second cylindrical array homogenizer 207 are set to the positions of pupils of the respective lenses of the array of the first cylindrical array homogenizer 206. The tandem lens structure of the second cylindrical array homogenizer 207 and the cylindrical condenser lens 209 results in an optically conjugate relationship between the pupils of the respective lenses of the array of the first cylindrical array homogenizer 206 and the modulation surface of the light modulation panel 212. Consequently, the pupils of the respective lenses of the array of the first cylindrical array homogenizer 206 are imaged on the modulation surface of the light modulation panel 212 in the vertical direction in FIG. 2.

The luminous flux emitted from the lamp unit formed of the gas exciting light source 200 and the parabolic reflecting mirror 201 is not completely collimated and has slight divergence. The second cylindrical array homogenizer 207 corrects the divergence of the luminous flux to reliably guide the luminous flux transmitted through the pupil of each lens of the array of the first cylindrical array homogenizer 206 to the modulation surface of the light modulation panel 212.

The luminous fluxes transmitted through the second cylindrical array homogenizer 207 are incident on a polarization conversion element array 208. The polarization conversion element array 208 is similar to that called a PS conversion element which is generally used in a liquid crystal projector. The polarization conversion element array 208 changes the light emitted from the lamp unit into polarized light components in parallel with one direction, for example with the vertical direction in FIG. 2, by an array of polarization beam splitters. Specifically, the polarization conversion element array 208 transmits light components polarized in the vertical direction in FIG. 2 through a polarization splitting film and reflects light components polarized in the horizontal direction in FIG. 2 by the polarization splitting film, and the reflected light components are again reflected by a polarization splitting film of the adjacent polarization beam splitter of the array to shift the optical path by a pitch in the array. The polarization direction of the light is changed 90 degrees by a half-wave plate (not shown) immediately before emerging from the polarization light conversion element array, and then the light emerges as linearly polarized light in the vertical direction in FIG. 2. In this manner, all luminous fluxes transmitted through the polarization conversion element array 208 become linearly polarized light in the vertical direction in FIG. 2.

The luminous fluxes transmitted through the polarization conversion element array 208 are incident on a first cylindrical lens 205. The first cylindrical lens 205 has a refractive power only in a horizontal direction in FIG. 2, and forms a beam compressor as a pair with a second cylindrical lens 210 disposed in a direction in which the luminous fluxes travel. Thus, the luminous fluxes incident on the first cylindrical lens 205 are compressed in the horizontal direction in FIG. 2, and are basically guided to the light modulation panel 212 in the afocal state.

In Embodiment 2, however, the beam compressor is intentionally provided with a predetermined amount of pupil distortion aberration which controls light intensity on the modulation surface of the light modulation panel 212 to have uniform or arbitrary distribution. The effects of the pupil distortion aberration of the beam compressor are later described with reference to FIG. 5.

The luminous fluxes transmitted through the first cylindrical lens 205 are incident on the cylindrical condenser lens 209. As described above, the cylindrical condenser lens 209 superimposes the luminous fluxes in the vertical direction in FIG. 2 for integration on the modulation surface of the light modulation panel 212 located at the position of the focal line of the cylindrical condenser lens 209.

The luminous fluxes transmitted through the cylindrical condenser lens 209 are incident on the second cylindrical lens 210. The second cylindrical lens 210 has a refractive power only in the horizontal direction in FIG. 2 and forms the beam compressor as a pair with the first cylindrical lens 205 as described above. Thus, the luminous fluxes are compressed in the horizontal direction in FIG. 2 and guided to the light modulation panel 212 in the afocal state.

The second cylindrical lens 210 is arranged to dispose a pupil of the first cylindrical lens 205 and the modulation surface of the light modulation panel 212 in an optically conjugate relationship (the optically conjugate relationship has low accuracy due to the aberration intentionally provided for the beam compressor). The pupil of the first cylindrical lens 205 is thus imaged on the modulation surface of the light modulation panel 212 in the horizontal direction in FIG. 2.

The second cylindrical lens 210 is provided for correcting the divergence of the luminous flux emitted from the lamp unit formed of the gas exciting light source 200 and the parabolic reflecting mirror 201 to reliably guide the luminous flux transmitted through the pupil of the first cylindrical lens 205 to the modulation surface of the light modulation panel 212, similarly to the function of the second cylindrical array homogenizer 207.

The luminous fluxes transmitted through the cylindrical lens 210 are incident on a dummy polarization beam splitter 211. The dummy may be formed of a dichroic prism or mirror instead. Whether the dummy is formed of a polarization beam splitter or a dichroic prism, the deflection direction of the luminous fluxes is set to the horizontal direction in FIG. 2.

As described above, the luminous fluxes transmitted through the illumination optical system of Embodiment 2 are guided to the light modulation panel 212. The illumination characteristics of Embodiment 2 are later described.

(About Optical Integrator)

Figure 3:
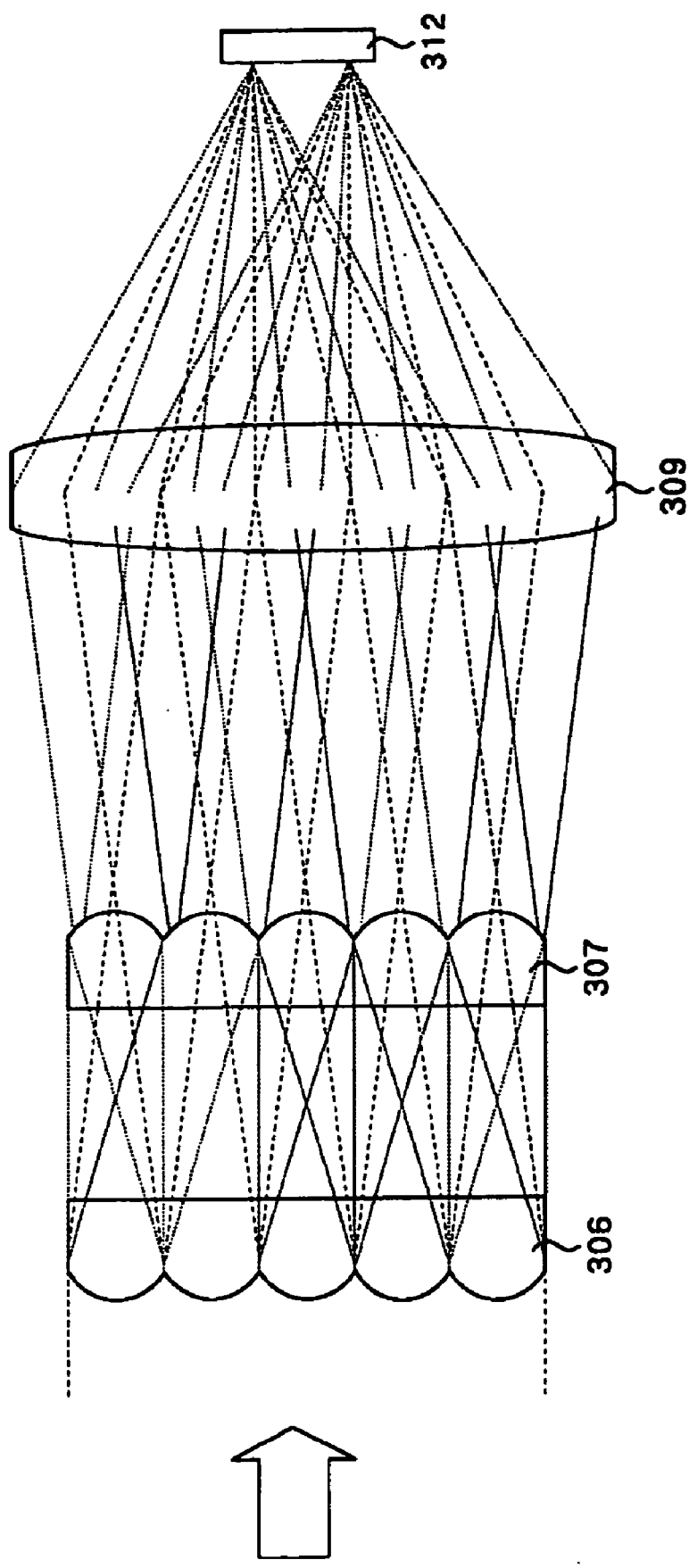
FIG. 3 is a schematic diagram for explaining the function of an optical integrator incorporated in the illumination optical systems of Embodiments 1 and 2.

Next, description is made for the optical integrators used in the illumination optical systems of Embodiments 1 and 2 with reference to FIG. 3.

In optical elements disposed in FIG. 3, a first cylindrical array homogenizer 306 corresponds to the first cylindrical array homogenizer 106 in Embodiment 1 and corresponds to the first cylindrical array homogenizer 206 in Embodiment 2. A second cylindrical array homogenizer 307 corresponds to the second cylindrical array homogenizer 107 in Embodiment 1 and corresponds to the second cylindrical array homogenizer 207 in Embodiment 2.

A cylindrical condenser lens 309 corresponds to the cylindrical condenser lens 109 in Embodiment 1 and corresponds to the cylindrical condenser lens 209 in Embodiment 2.

The first and second cylindrical array homogenizers 306 and 307 and the cylindrical condenser lens 309 constitute the optical integrator.

A light modulation panel 312 in FIG. 3 corresponds to the light modulation panel 112 in Embodiment 1 and corresponds to the light modulation panel 212 in Embodiment 2.

A luminous fluxes indicated by an arrow in FIG. 3, which is guided to the first cylindrical array homogenizer 306, and generally collimated in an optical integration direction is split by pupils of lenses in the array in the vertical direction in FIG. 3 and condensed on respective focal lines. The positions of the focal lines of the first cylindrical array homogenizer 306 are close to the positions of pupils of the second cylindrical array homogenizer 307, and are arranged such that the incident luminous flux indicated by the arrow is hardly subjected to a refractive effect by the second cylindrical array homogenizer 307 when the luminous flux is completely collimated ideal light.

Each luminous flux transmitted through the second cylindrical array homogenizer 307 is guided to the cylindrical condenser lens 309. Since the optical axis of each luminous flux is shifted from the optical axis of the cylindrical condenser lens 309, the optical axes of the respective luminous fluxes split by the pupils of the lenses of the array of the first cylindrical array homogenizer 306 are collected at the position of a focal line of the cylindrical condenser lens 309.

The distance between the principal planes of the first cylindrical array homogenizer 306 and the cylindrical condenser lens 309 is set to the sum of the focal length of the first cylindrical array homogenizer 306 and the focal length of the cylindrical condenser lens 309. Thus, each luminous flux split by the pupil of each lens of the array of the first cylindrical array homogenizer 306 is transmitted through the cylindrical condenser lens 309 to become collimated light in cross section of FIG. 3.

The width of the collimated light is set to be enlarged at a ratio of the focal length of the first cylindrical array homogenizer 306 to the focal length of the cylindrical condenser lens 309.

On the other hand, a modulation surface of the light modulation panel 312 is disposed at the position of the focal line of the cylindrical condenser lens 309. This achieves an optical integration operation on the modulation surface of the light modulation panel 312. Consequently, the luminous flux incident on the illumination optical system is converted to light having generally uniform light intensity distribution which is irradiated to the modulation surface of the light modulation panel 312, irrespective of light intensity distribution at the time of the incidence.

Next, description is made for the function of the second cylindrical array homogenizer 307. The incident luminous flux indicated by the arrow in FIG. 3 is not completely collimated. Especially, in Embodiments 1 and 2 which employ the gas exciting light emission source rather than a laser, the area for excitation and light emission has a finite area on the order of 0.1 mm at the minimum. Thus, even the use of a collimating lens or a parabolic reflecting mirror cannot provide a completely collimated beam, and the aforementioned incident luminous flux always includes divergence (a divergence angle).

The second cylindrical array homogenizer 307 is provided for correcting a blurred outline of an illumination area on the light modulation panel 312 due to the divergence error.

Description is hereinafter made with reference to FIG. 3. The luminous fluxes split by the pupils of the lenses of the array of the first cylindrical array homogenizer 306 have divergence components from the entire pupil area. Thus, the pupil images of the lenses of the array of the first cylindrical array homogenizer 306 are projected and formed onto the modulation surface of the light modulation panel 312 by the recombination system formed of the second cylindrical array homogenizer 307 and the cylindrical condenser lens 309.

The position of a focal line on the side of light incidence of each lens of the array of the second cylindrical array homogenizer 307 is set to the pupil position of each lens of the array of the first cylindrical array homogenizer 306. The divergence components of the luminous fluxes split by the pupils of the lenses of the array of the first cylindrical array homogenizer 306 are shown by fine dotted lines in FIG. 3. The luminous fluxes split by the pupils of the lenses of the array of the first cylindrical array homogenizer 306 are transmitted by the second cylindrical array homogenizer 307 and thus converted into collimated light in cross section of FIG. 3. The collimated light is condensed to focal line plane of the cylindrical condenser lens 309 by the cylindrical condenser lens 309.

In other words, the pupil images of the lenses of the array of the first cylindrical array homogenizer 306 are superimposed and formed into images in a state where the images are optically integrated on the modulation surface of the light modulation panel 312. Thus, the modulation surface of the light modulation panel 312 is illuminated by light which has intensity distribution with sharp edges in cross section of FIG. 3.

(About Shuffling Prism)

Figure 4:
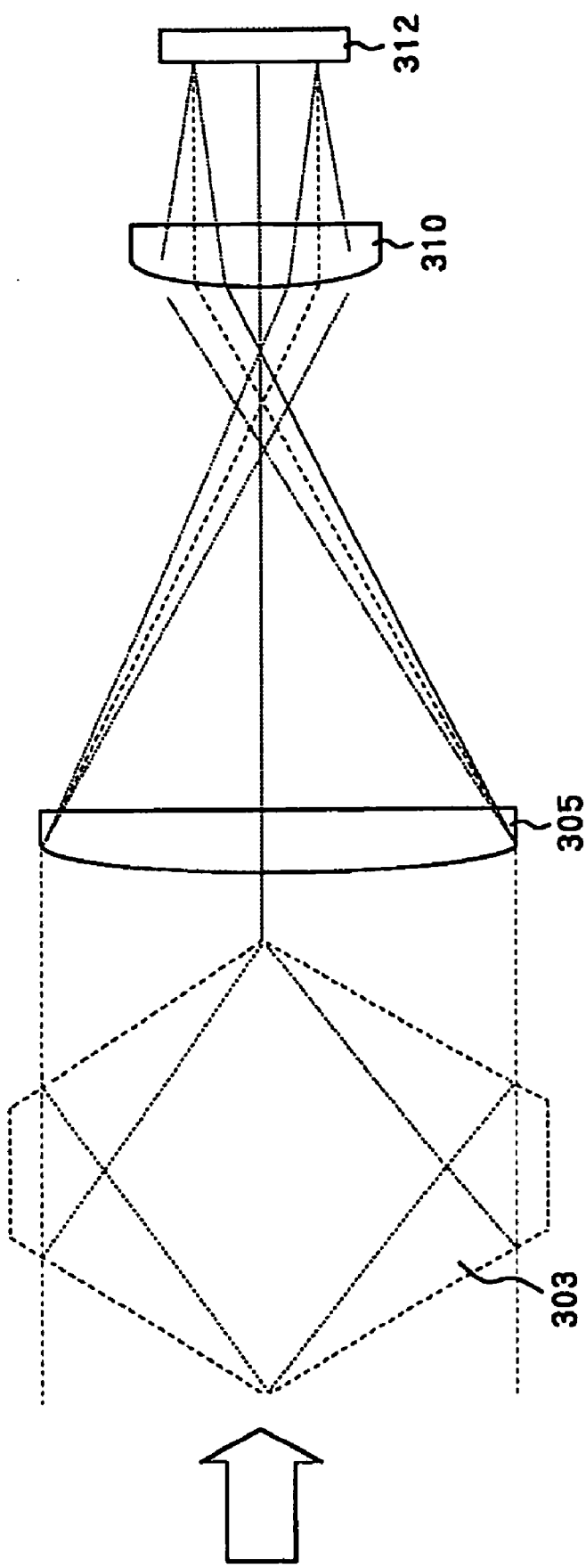
FIG. 4 is a schematic diagram for explaining the function of light intensity conversion optics incorporated in the illumination optical system of Embodiment 1.

Next, description is made for the shuffling prism serving as the optical intensity conversion optics incorporated in the illumination optical system of Embodiment 1 with reference to FIG. 4.

In optical elements disposed in FIG. 4, a shuffling prism 303 corresponds to the shuffling prism 103 in Embodiment 1. The first cylindrical lens 305 corresponds to the first cylindrical lens 105 in Embodiment 1, and the second cylindrical lens 310 corresponds to the second cylindrical lens 110 in Embodiment 1. The light modulation panel 312 corresponds to the light modulation panel 112 in Embodiment 1.

Part of a generally collimated luminous flux indicated by an arrow in FIG. 4 is transmitted through the shuffling prism 303. The shuffling prism 303 has a structure in which opposite surfaces are arranged in parallel with each other, and thus can be considered as a combination of parallel plates. Coarse dotted lines in FIG. 4 show luminous fluxes which pass both over and under the shuffling prism 303 in a direction orthogonal to the sheet of FIG. 4, while fine dotted lines show luminous fluxes transmitted within the shuffling prism 303.

The luminous flux incident on the shuffling prism 303 is shifted in the up-down direction in FIG. 4 by the opposite parallel surfaces. In a direction orthogonal to the sheet, the upper half of the incident luminous flux shown by the arrow is shifted such that the upper end portion is directed to the center. The thickness of the shuffling prism 303 is set to achieve the shift.

Specifically, the upper half of the incident luminous flux is shifted to become the lower half, while the lower half of the incident luminous flux is shifted to become the upper half. The luminous flux emerges in this interchanged form. In other words, only the part of the incident luminous flux indicated by the arrow in FIG. 4 and transmitted through the shuffling prism 303 emerges as the luminous flux which has the central portion and the peripheral portion interchanged, and the upper and lower portions interchanged in the sheet.

The luminous flux emerging from the shuffling prism 303 is guided to the first cylindrical lens 305. The first cylindrical lens 305 and the second cylindrical lens 310 disposed next constitute an afocal beam compressor of a convex-convex pair.

The magnification of beam compression is set such that the width of the compressed incident luminous flux generally matches the effective width of the light modulation panel 312.

The spacing between the principal planes of the first cylindrical lens 305 and the second cylindrical lens 310 is set to the sum of the focal length of the first cylindrical lens 305 and the focal length of the cylindrical lens 310. Thus, in cross section of the sheet of FIG. 4, the luminous flux incident as generally collimated light emerges as generally collimated light with an angular magnification corresponding to the reciprocal of the compression magnification and irradiated to the light modulation panel 312.

On the other hand, the second cylindrical lens 310 has another function. The incident luminous flux indicated by the arrow in FIG. 4 is not completely collimated. Especially, in Embodiment 1 which employs the gas exciting light emission source rather than a laser, the area for excitation and light emission has a finite area on the order of 0.1 mm at the minimum. Thus, even the use of a collimating lens or a parabolic reflecting mirror cannot provide a completely collimated beam, and the incident luminous flux always includes divergence (a divergence angle).

The second cylindrical lens 310 has the function of correcting a blurred outline of an illumination area on the light modulation panel 312 due to the divergence error.

The first cylindrical lens 305 transmits the luminous flux with divergence components from the entire pupil area. Thus, the pupil image of the first cylindrical lens 305 is projected and formed onto the modulation surface of the light modulation panel 312 by the second cylindrical lens 310.

The position of an image-forming conjugate line on the side of light incidence of the second cylindrical lens 310 is set to the pupil position of the first cylindrical lens 305. The position of an image-forming conjugate line on the side of light emergence of the second cylindrical lens 310 is set to the modulation surface of the light modulation panel 312. The divergence components of the luminous flux from the pupil of the first cylindrical lens 305 are shown by fine dotted lines in FIG. 4. Each luminous flux split by the pupil of the first cylindrical lens 305 is transmitted through the second cylindrical lens 310 and thus condensed on the modulation surface of the light modulation panel 312 in cross section of FIG. 4.

In other words, the pupil image of the second cylindrical lens 310 is transferred and formed into an image on the modulation surface of the light modulation panel 312.

Description is here made for light intensity distribution with which the light modulation panel is illuminated by using a combination of the shuffling prism 303 and the optical integrator described in FIG. 3, with reference to FIGS. 6(A) to 6(C) and 7(A) to 7(C).

Figure 6:
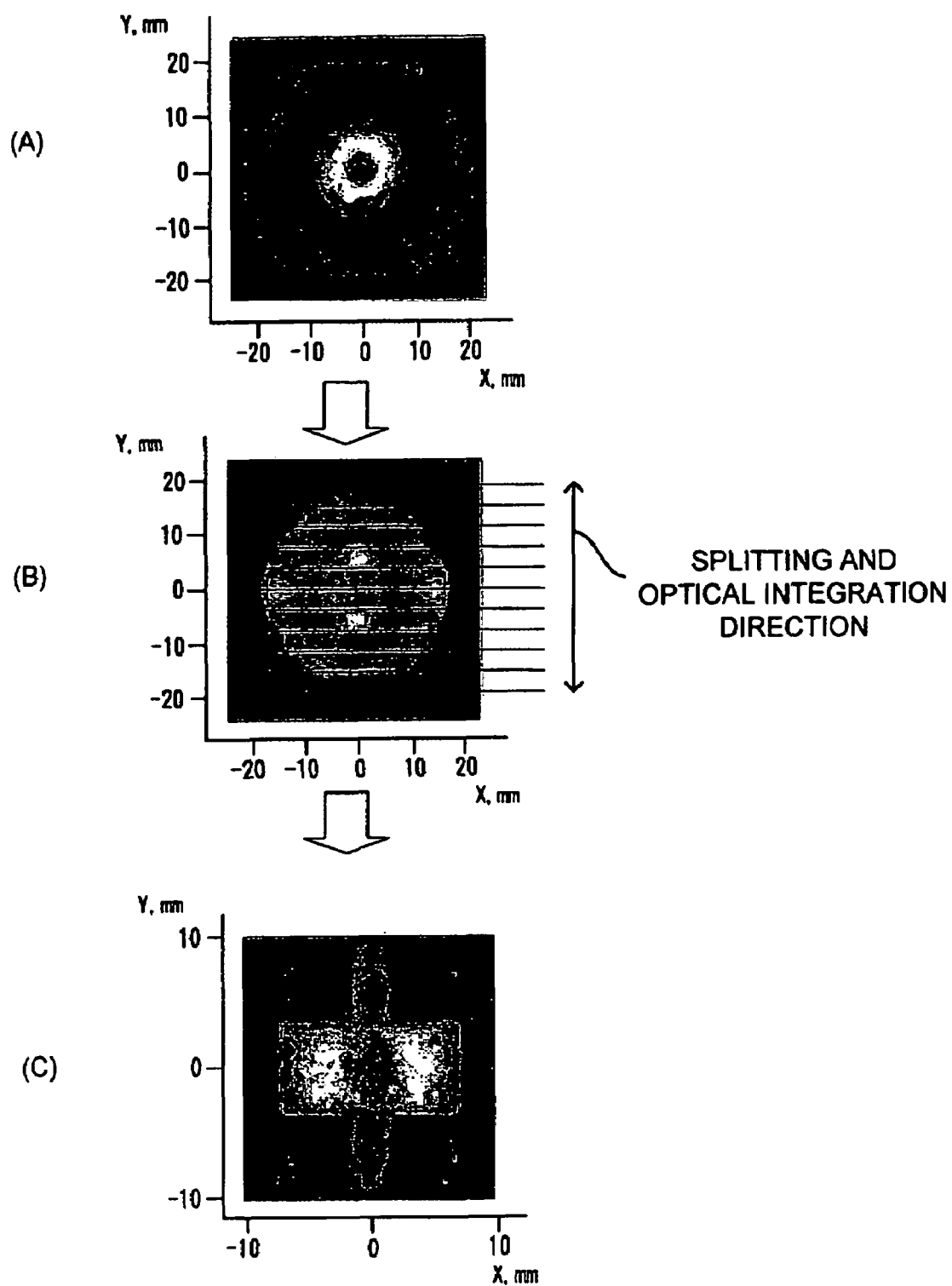
FIGS. 6(A) to 6(C) are diagrams for explaining the process of producing generally uniform light intensity distribution by the illumination optical system of Embodiment 1.
Figure 7:
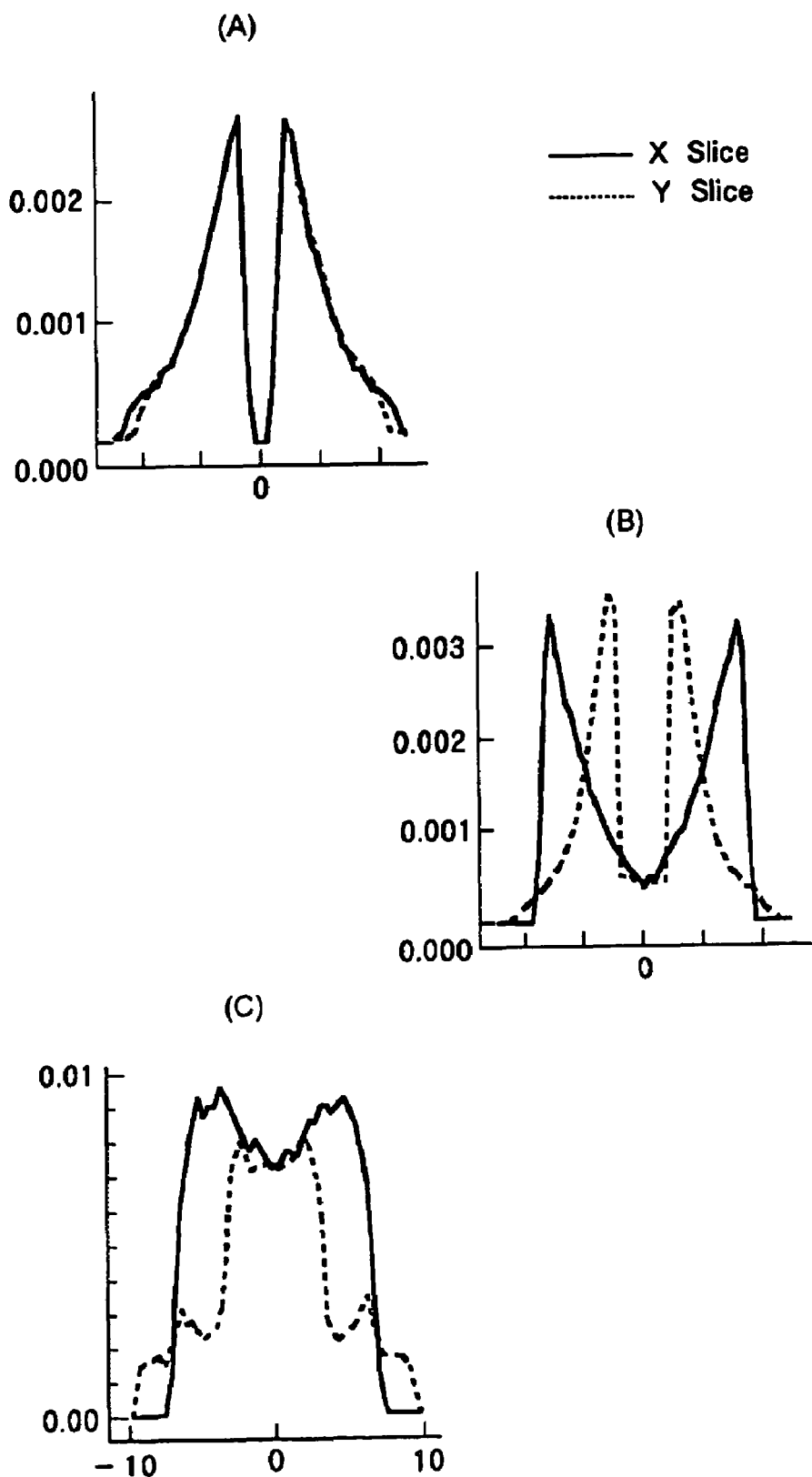
FIGS. 7(A) to 7(C) are graphs for explaining the process of producing generally uniform light intensity distribution by the illumination optical system of Embodiment 1.

FIGS. 6(A) to 6(C) and 7(A) to 7(C) show the process of forming light intensity distribution on the light modulation panel by the illumination optical system of Embodiment 1. FIGS. 6(A) and 7(A) show a cross sectional profile of the luminous flux emitted from the lamp unit formed of the gas exciting light source and the parabolic reflecting mirror. In FIG. 6(A), a brighter portion indicates a higher light intensity. In FIG. 7(A), a solid line shows light intensity distribution in cross section in a horizontal (X) direction at the center (0 mm) in a vertical (Y) direction of FIG. 6(A), while a dotted line shows light intensity distribution in cross section in the vertical (Y) direction at the center (0 mm) in the horizontal (X) direction of FIG. 6(A).

The light intensity distribution of the luminous flux shown in FIGS. 6(A) and 7(A) is converted into a cross sectional profile of the luminous flux shown in FIGS. 6(B) and 7(B) by the shuffling prism and the reflecting mirror which reverse the distribution at the central portion and the peripheral portion in the central area of the luminous flux and also reverse the distribution on the left and right.

In FIG. 6(B), areas sectioned by horizontal lines correspond to the areas split and integrated by the optical integrator. Finally, light intensity distribution shown in FIGS. 6(C) and 7(C) can be provided on the modulation surface of the light modulation panel.

As can be seen from FIGS. 6(C) and 7(C), the light intensity distribution of the illumination luminous flux incident on the modulation surface of the light modulation panel has high intensity and is generally flat (uniform).

It goes without saying, however, that the ray density distribution on the modulation surface of the light modulation panel can be changed in accordance with a purpose by designing the thickness of the shuffling prism in the direction of optical integration, the number of the shuffling prisms, or the shift amount of the luminous flux to predetermined values. In this manner, the illumination luminous flux incident on the modulation surface of the light modulation panel can be intentionally provided with predetermined light intensity distribution in the direction in which the light intensity conversion optics exert the effect.

Figure 5:
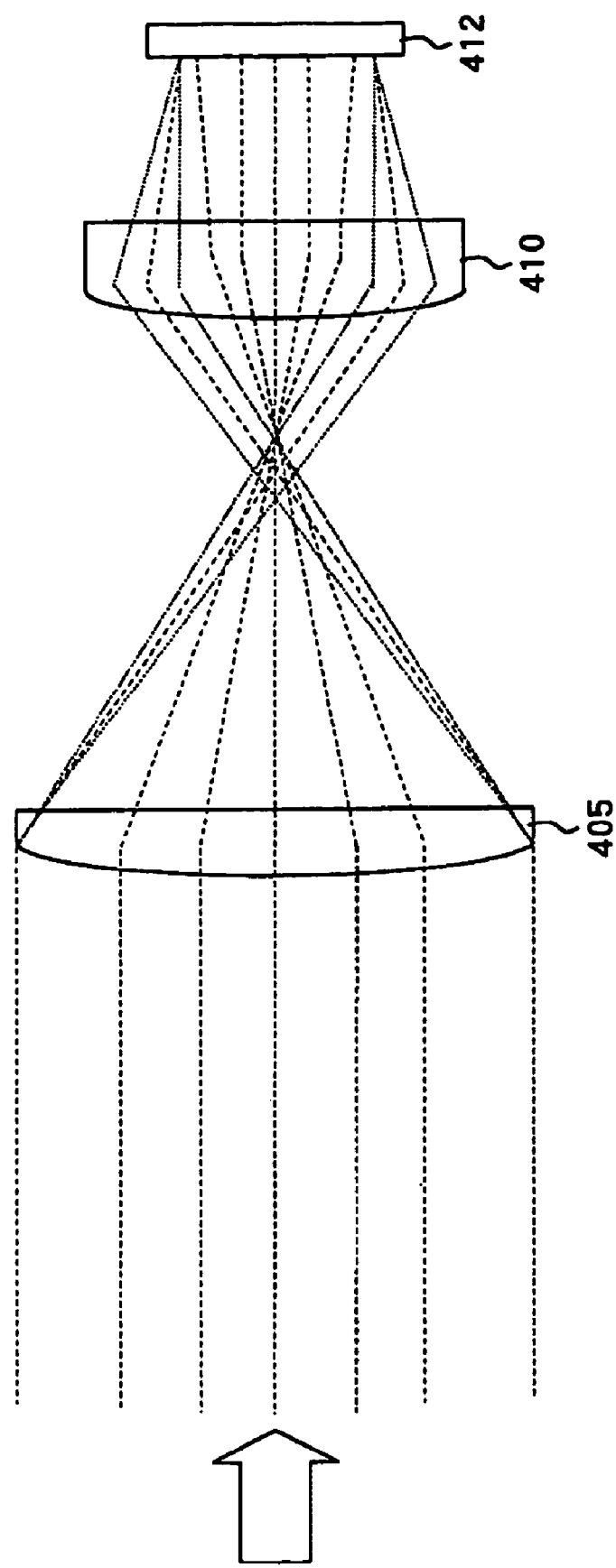
FIG. 5 is a schematic diagram for explaining the function of light intensity conversion optics incorporated in the illumination optical system of Embodiment 2.

Next, description is made for the optics which convert light intensity distribution incorporated in the illumination optical system of Embodiment 2 with reference to FIG. 5.

In optical elements in FIG. 5, a first cylindrical lens 405 corresponds to the first cylindrical lens 205 in Embodiment 2, and the second cylindrical lens 410 corresponds to the second cylindrical lens 210 in Embodiment 2. The light modulation panel 412 corresponds to the light modulation panel 212 in Embodiment 2.

A generally collimated luminous flux indicated by an arrow in FIG. 5 is incident on the first cylindrical lens 405. The first cylindrical lens 405 and the second cylindrical lens 410 disposed next constitute an afocal beam compressor of a convex-convex pair. The magnification of beam compression is set such that the width of the compressed incident luminous flux substantially matches the effective width of the light modulation panel 312.

The spacing between the principal planes of the first cylindrical lens 405 and the second cylindrical lens 410 is set to the sum of the focal length of the first cylindrical lens 405 and the focal length of the second cylindrical lens 410. Thus, in cross section of the sheet of FIG. 5, the luminous flux incident as the generally collimated light emerges as generally collimated light with an angular magnification corresponding to the reciprocal of the compression magnification and irradiated to the light modulation panel 412.

On the other hand, the second cylindrical lens 410 has another function. The incident luminous flux indicated by the arrow in FIG. 5 is not completely collimated. Especially, in Embodiment 2 which employs the gas exciting light emission source rather than a laser, the area for excitation and light emission has a finite area on the order of 0.1 mm at the minimum. Thus, even the use of a collimating lens or a parabolic reflecting mirror cannot provide a completely collimated beam, and the incident luminous flux always includes divergence (a divergence angle).

The second cylindrical lens 410 has the function of correcting a blurred outline of an illumination area on the light modulation panel 412 due to the divergence error.

The first cylindrical lens 405 transmits the luminous flux with divergence components from the entire pupil area. The pupil image of the first cylindrical lens 405 is projected and formed onto a modulation surface of the light modulation panel 412 by the second cylindrical lens 410.

The position of an image-forming conjugate line on the side of light incidence of the second cylindrical lens 410 is set to the pupil position of the first cylindrical lens 405. The position of an image-forming conjugate line on the side of light emergence of the second cylindrical lens 410 is set to the modulation surface of the light modulation panel 412. The divergence components of the luminous flux from the pupil of the first cylindrical lens 405 are shown by fine dotted lines in FIG. 5. Each luminous flux split by the pupil of the first cylindrical lens 405 is transmitted through the second cylindrical lens 410 and thus condensed on the modulation surface of the light modulation panel 412 in cross section of FIG. 5. In other words, the pupil image of the second cylindrical lens 410 is transferred and formed into an image on the modulation surface of the light modulation panel 412.

The beam compressor formed of the first cylindrical lens 405 and the second cylindrical lens 410 is an afocal optical system. Pupil distortion aberration, also referred to as spherical aberration in an afocal system, is intentionally provided as aberration caused by the pupil image transfer by the beam compressor. Each cylindrical surface of the first cylindrical lens 405 and the second cylindrical lens 410 has a small curvature and is designed to produce more aberration in accordance with a shift amount from the optical axis. As shown by coarse dotted lines in FIG. 5, rays close to the optical axis are transmitted through the second cylindrical lens 410 and then converted to a slightly divergent luminous flux in cross section of the sheet of FIG. 5.

On the other hand, rays on the periphery of the pupil away from the optical axis are transmitted through the second cylindrical lens 410 and then converted to a slightly convergent luminous flux in cross section of the sheet of FIG. 5. Since the changes of divergence and convergence are continuously and smoothly provided in this manner, the ray density is low at the central portion and high at the peripheral portion on the modulation surface of the light modulation panel 412 in cross section of the sheet of FIG. 5. Light intensity distribution illuminating the modulation surface of the light modulation panel 412 is provided by multiplying light intensity distribution of the incident luminous flux indicated with the arrow from the lamp unit formed of the gas exciting light source and the parabolic reflecting mirror by the aforementioned ray density distribution.

Figure 8:
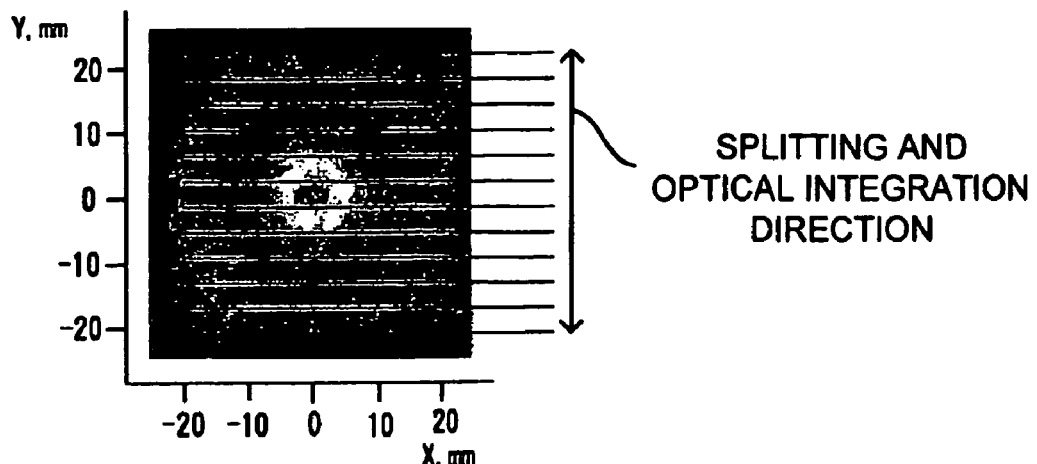
FIGS. 8(A) to 8(C) are diagrams for explaining the process of producing generally uniform light intensity distribution by the illumination optical system of Embodiment 2.
Figure 8:
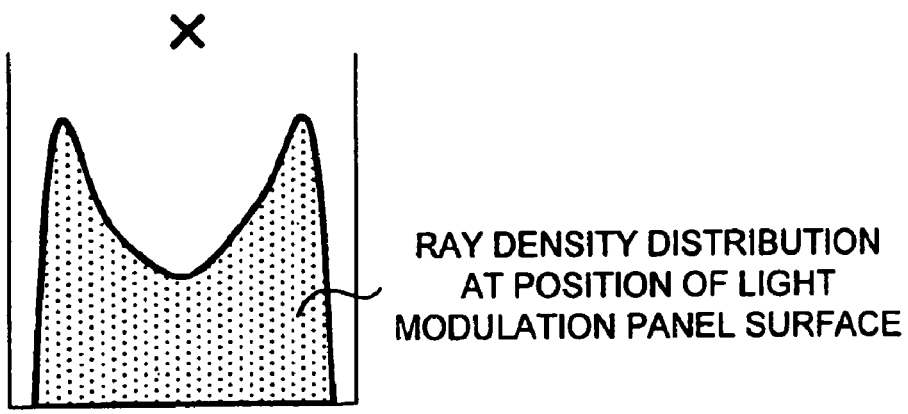
Figure 8:
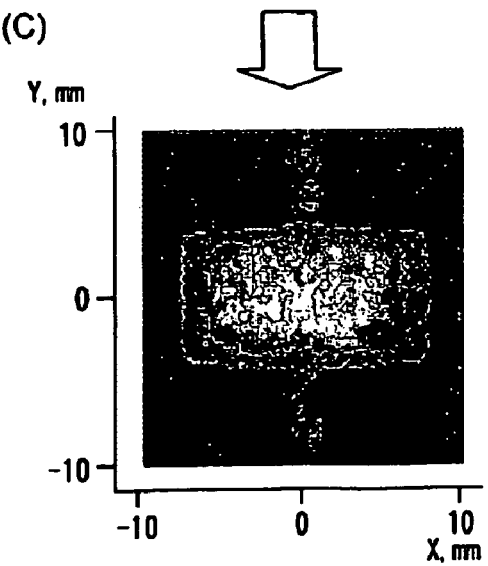

Description is here made for light intensity distribution with which the light modulation panel is illuminated by using a combination of the light intensity conversion optics and the optical integrator described in FIG. 3, with reference to FIGS. 8(A) to 8(C) and, 9(A) and 9(C).

Figure 9:
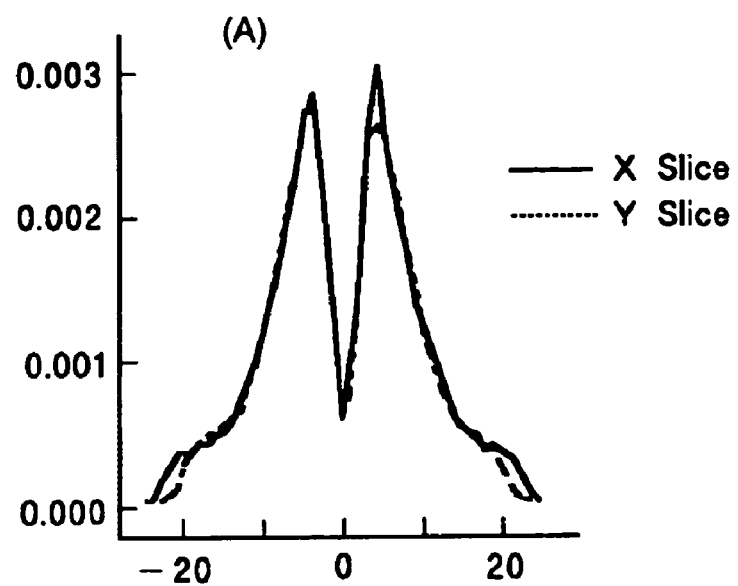
FIGS. 9(A) and 9(C) which correspond to FIGS. 8(A) and 8(C) respectively, are graphs for explaining the process of producing generally uniform light intensity distribution by the illumination optical system of Embodiment 2.
Figure 9:
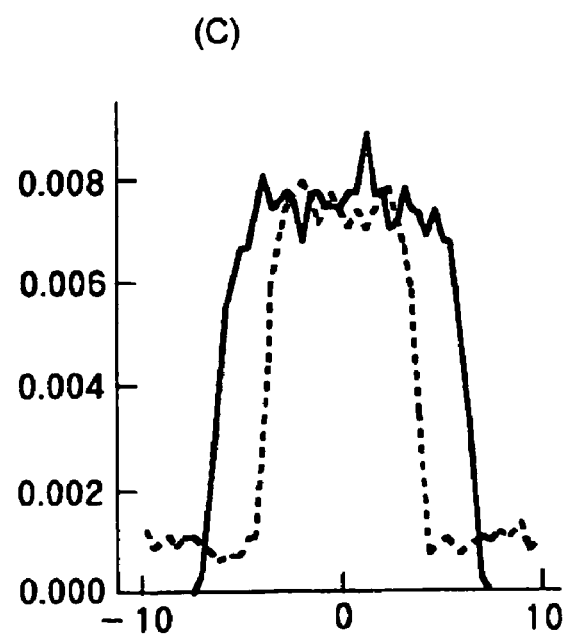

FIGS. 8(A) to 8(C) and, 9(A) and 9(C) show the process of forming light intensity distribution on the light modulation panel by the illumination optical system of Embodiment 2. FIGS. 8(A) and 9(A) show a cross sectional profile of the luminous flux emitted from the lamp unit formed of the gas exciting light source and the parabolic reflecting mirror. In FIG. 8(A), a brighter portion indicates a higher light intensity. In FIG. 9(A), a solid line shows light intensity distribution in cross section in a horizontal (X) direction at the center (0 mm) in a vertical (Y) direction in FIG. 8(A), while a dotted line shows light intensity distribution in cross section in the vertical (Y) direction at the center (0 mm) in the horizontal (X) direction in FIG. 8(A).

The light intensity distribution shown in FIGS. 8(A) and 9(A) is divided and integrated by the optical integrator in areas sectioned by horizontal lines in FIG. 8(A). Then, ray density distribution on the modulation surface of the light modulation panel shown in FIG. 8(B) resulting from the aforementioned pupil distortion aberration of the beam compressor is multiplied in the direction of the light intensity conversion optics to provide light intensity distribution on the modulation surface of the light modulation panel shown in FIGS. 8(C) and 9(C).

As can be seen from FIGS. 8(C) and 9(C), the light intensity distribution of the illumination luminous flux incident on the modulation surface of the light modulation panel has high intensity and is generally flat (uniform).

It goes without saying, however, that the ray density distribution on the modulation surface of the light modulation panel can be changed in accordance with a purpose by designing the pupil distortion aberration of the beam compressor to a predetermined value. In this manner, the illumination luminous flux incident on the modulation surface of the light modulation panel can be intentionally provided with predetermined light intensity distribution in the direction in which the light intensity conversion optics exert the effect.

Next, characteristics provided by the illumination optical system explained so far are described with reference to FIGS. 10(A) to 10(C) and 11(A) to 11(C).

Figure 11:
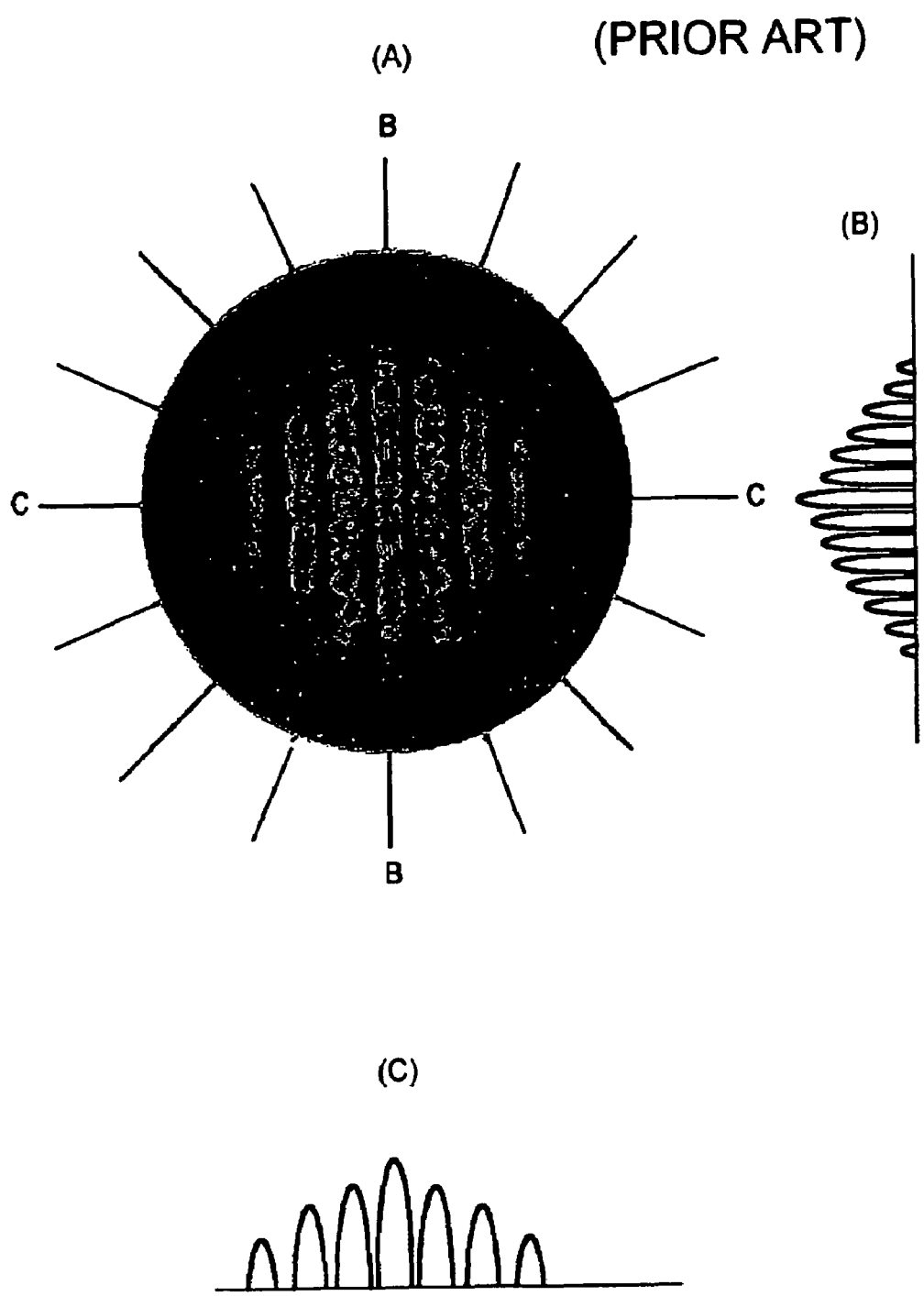
FIGS. 11(A) to 11(C) show light irradiation angle distribution on a light modulation panel by an illumination optical system using a conventional two-dimensional optical integrator.

FIGS. 11(A) to 11(C) show incident angle distribution of rays subjected to optical integration operation by a conventional pair of two-dimensional fly eye lens arrays on an illumination surface such as a modulation surface of a light modulation panel. In FIG. 11(A), the outer periphery of a circle corresponds to azimuth angles of 360 degrees, and radial axes show elevation angles with respect to the normal to the illumination surface (a perpendicular incident axis). In FIG. 11(A), the outer periphery is divided by the radial axes in elevation angles of 20 degrees. FIGS. 11(B) and 11(C) show light intensity distribution taken along a line B—B and a line C—C in FIG. 11(A), respectively.

Figure 10:
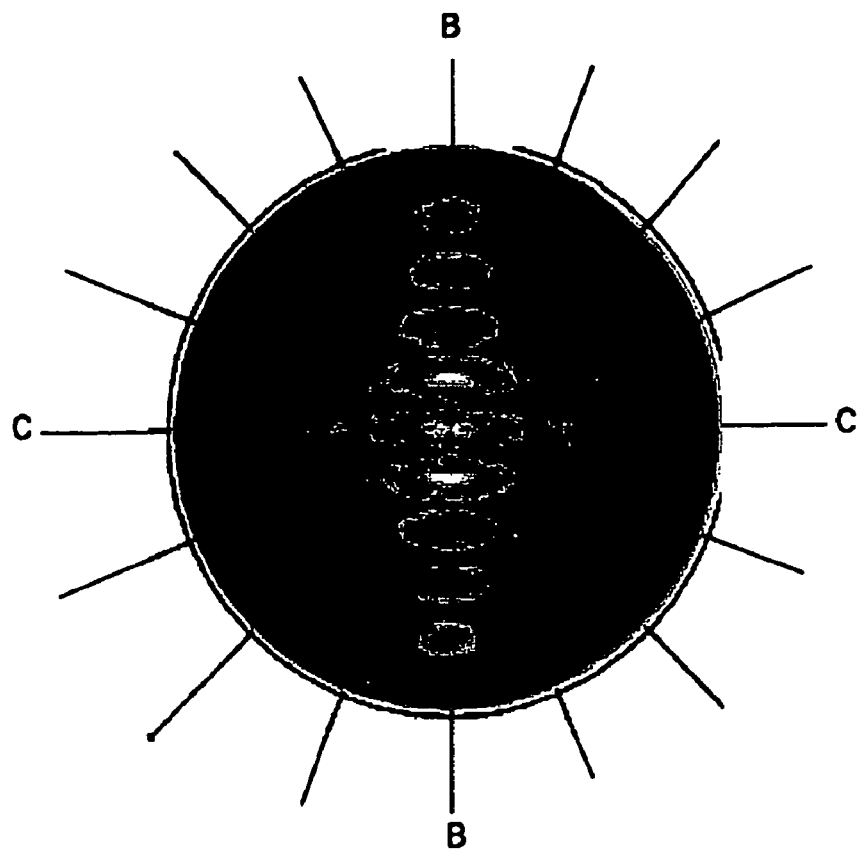
FIGS. 10(A) to 10(C) show light irradiation angle distribution on a light modulation panel by the illumination optical system of Embodiments 1 and 2.
Figure 10:
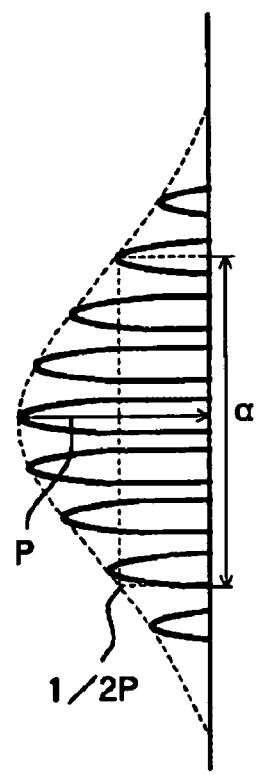
Figure 10:
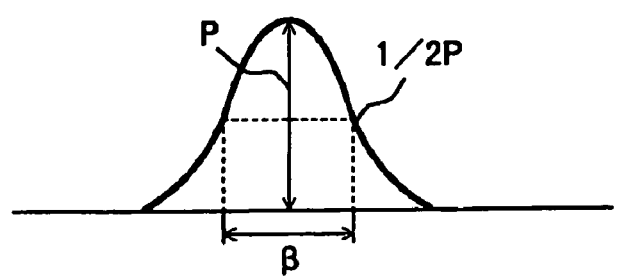

On the other hand, FIGS. 10(A) to 10(C) show incident angle distribution of rays provided by the illumination optical system of Embodiment 2 on an illumination surface such as a modulation surface of a light modulation panel. In FIG. 10(A), the outer periphery of a circle corresponds to azimuth angles of 360 degrees, and radial axes show angles of incident on the illumination surface. In FIG. 10(A), the outer periphery is divided by the radial axes in elevation angles of 20 degrees. FIGS. 10(B) and 10(C) show light intensity distribution taken along a line B—B and a line C—C in FIG. 10(A), respectively.

As can be seen from comparison between FIG. 10(A) and 11(A), the luminous flux irradiated to the illumination surface can have generally uniform light intensity distribution on the illumination surface in both cases. However, a large difference is found between them in incident angle characteristics of a luminous flux.

Specifically, as shown in FIG. 11(A), the illumination luminous flux subjected to the optical integration operation by the pair of two-dimensional fly eye lens arrays has symmetrical ray distribution in two directions of the azimuth on the illumination surface.

In contrast, in the present embodiment, as shown in FIG. 10(A), ray incident elevation angles in the optical integration direction (B—B direction) vertical in FIG. 10(A) are similar to those in FIG. 11(A), while in the direction in which the light intensity conversion optics exert the effect (C—C direction), no luminous fluxes are superimposed by optical integration operation, so that elevation angles dependent on the angular magnification determined by the compression magnification of the beam compressor are provided with respect to the divergent angle of the luminous flux emitted from the lamp unit. Thus, the ray incident angle on the illumination surface can be significantly reduced in the direction in which the light intensity conversion optics exert the effect.

Specifically, an illumination method is used in which, in the intensity distribution of illumination light on the illumination surface changing depending on the deviation angle of the incident ray with respect to the normal to the illumination surface, a ratio $\alpha:\beta$ is an aspect ratio of 2:1 or higher, where $\alpha$ and $\beta$ represent angle widths at which the light intensity reaches half of a peak value P (1/2P) in each of two directions (B—B axis and C—C axis) orthogonal to each other on the illumination surface.

More specifically, the angle width at which the light intensity reaches half of the peak value on the B—B axis is twice or more the angle width at which the intensity reaches half of the peak value on the C—C axis. Alternatively, the maximum value of the angle width at which the light intensity reaches half of the peak value in the B—B axis direction may be set to be twice or more the maximum value of the angle width at which the light intensity reaches half of the peak value in the C—C axis direction.

Description is hereinafter made for influences (advantages) exerted by the aforementioned characteristics on a projection type image display apparatus which employs the illumination optical system described above in Embodiments 3 to 6.

Embodiment 3

Figure 12:
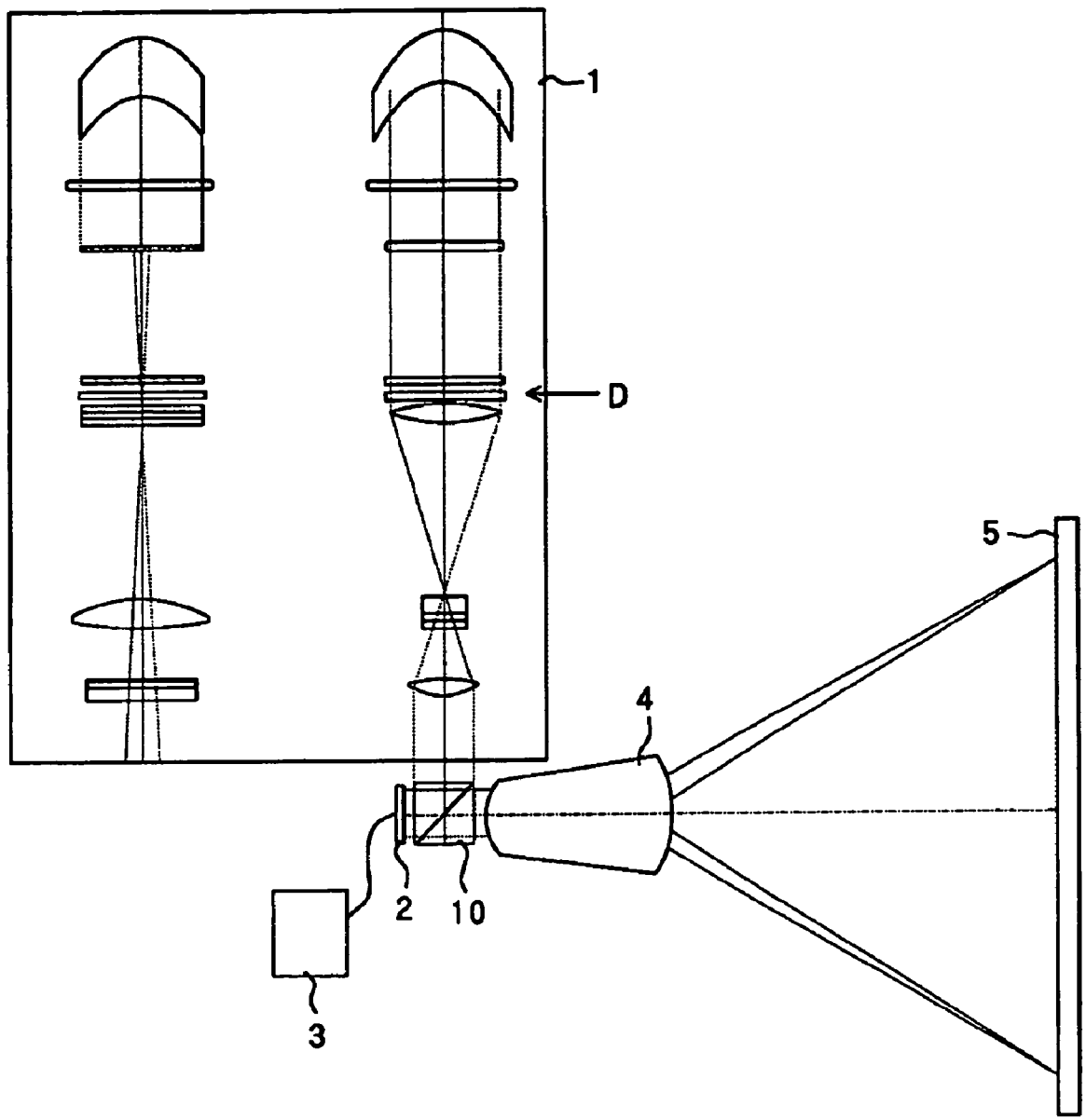
FIG. 12 is a schematic diagram showing the structure of a projection type image display apparatus which is Embodiment 3.

FIG. 12 shows the overall projection display optical system in a projection type image display apparatus which is Embodiment 3 of the present invention.

In FIG. 12, reference numeral 1 schematically shows the illumination optical system described in Embodiments 1 and 2. A representation on the left in the frame in the figure shows the illumination optical system on the right viewed from an arrow D.

Reference numeral 2 shows a reflection type liquid crystal modulation panel (hereinafter referred to as a liquid crystal modulation panel). Reference numeral 3 shows a light modulation panel driver which converts an external video input signal from an image information supply apparatus such as a personal computer, a television, a VCR, and a DVD player, not shown, into a driving signal for driving the liquid crystal modulation panel 2. The liquid crystal modulation panel 2 forms an original image with liquid crystal corresponding to the driving signal input thereto to modulate an illumination luminous flux incident on the liquid crystal modulation panel 2.

Reference numeral 10 shows a polarization beam splitter which reflects, of illumination light from the illumination optical system 1, linearly polarized light polarized in a direction orthogonal to the sheet of FIG. 12 by a polarization splitting surface (reflects S-polarized light) and guides the polarized light to the liquid crystal modulation panel 2.

The illumination light incident on the liquid crystal modulation panel 2 (the linearly polarized light in the direction orthogonal to the sheet) is given a phase difference of the polarization in accordance with the modulation state of pixels arranged in the liquid crystal modulation panel 2. Light components in a direction in parallel with the sheet are transmitted as P-polarized light through the polarization splitting surface of the polarization beam splitter 10, while light components in the direction orthogonal to the sheet are reflected as S-polarized light by the polarization splitting surface of the polarization beam splitter 10 and return toward the illumination optical system 1.

The light components as P-polarized light transmitted through the polarization splitting surface of the polarization beam splitter 10 are taken by the entrance pupil of a projection lens 4 without any change. Since the projection lens 4 is arranged to dispose a modulation surface of the liquid crystal modulation panel 2 and a diffusion surface of a light diffusion screen 5 in an optically conjugate relationship, the original image formed on the modulation surface of the liquid crystal modulation panel 2 is projected and displayed as an image (an image corresponding to the video signal) on the light diffusion screen 5.

The polarization beam splitter 10 is a typically used polarization beam splitter of a MacNeil type and has the polarization splitting surface for S-polarized light and P-polarized light by means of the Brewster angle. In the polarization beam splitter 10, as a deviation amount of the incident angle of a ray from 45 degrees with respect to the polarization splitting surface is increased, accuracy of splitting of S-polarized light and P-polarized light is suddenly reduced. The accuracy of splitting of S-polarized light and P-polarized light can be actually maintained at a ratio of approximately 50:1 when a deviation amount from 45 degrees falls within approximately ±3 degrees.

If the optical integrator implemented by the conventional pair of two-dimensional fly eye lens arrays is used in the illumination optical system, the luminous flux with the incident angle distribution as shown in FIG. 11(A) is incident on the polarization beam splitter 10. This produces the disadvantage that, of luminous fluxes with a deviation amount of incident angle of ±3 degrees or more from 45 degrees with respect to the polarization splitting surface, a proportion of P-polarized light is reflected, and a proportion of S-polarized light is transmitted.

The polarized light is given a phase difference in accordance with the modulation state of pixels arranged in the liquid crystal modulation panel 2. However, when the liquid crystal panel 2 sends linearly polarized light (modulated light) polarized in the direction orthogonal to the sheet of FIG. 12 to display black on the screen, a luminous flux inclined three degrees or more from 45 degrees with respect to the polarization splitting surface of the polarization beam splitter 10 includes a proportion of S-polarized light which is transmitted through the surface and reaches the light diffusion screen 5 through the projection lens 4. As a result, the intended black is displayed in gray to reduce illuminance contrast.

For the polarized light modulation characteristics of the liquid crystal modulation panel 2, when twisted nematic liquid crystal is used in the liquid crystal modulation panel 2, the liquid crystal modulation panel 2 fundamentally has the characteristic that it cannot accurately provide a phase difference for polarized light incident on the liquid crystal modulation panel 2 at an azimuth of 45 degrees. For this reason, in the optical integrator implemented by the conventional pair of two-dimensional fly eye lens arrays which illuminates light from azimuth generally symmetrical with respect to the axis, polarized light modulation by the liquid crystal is not sufficient, and intended black display is shown in gray to reduce illuminance contrast, similarly to the incident angle dependency characteristics of the polarization beam splitter 10 described above.

In contrast, in the projection type image display apparatus of Embodiment 3, the illumination optical system 1 of Embodiments 1 and 2 can be used to provide a luminous flux with the incident angle distribution as shown in FIG. 10(A). When the luminous flux is incident on the polarization beam splitter 10, a deviation amount of the incident angle from 45 degrees with respect to the polarization splitting surface falls within ±3 to 4 degrees. This can almost eliminate a reduction in illuminance contrast due to the polarization splitting error which means that polarization splitting does not match the modulation state of the pixels in the liquid crystal modulation panel occurring when the optical integrator implemented by the conventional pair of two-dimensional fly eye lens arrays is used.

For the liquid crystal modulation panel 2, since almost no components of illumination luminous fluxes are directed from an azimuth at which polarized light modulation by the liquid crystal is not sufficiently achieved, a reduction in illuminance contrast is almost eliminated, similarly to the incident angle dependency characteristics of the polarization beam splitter 10 described above.

Embodiment 4

Figure 13:
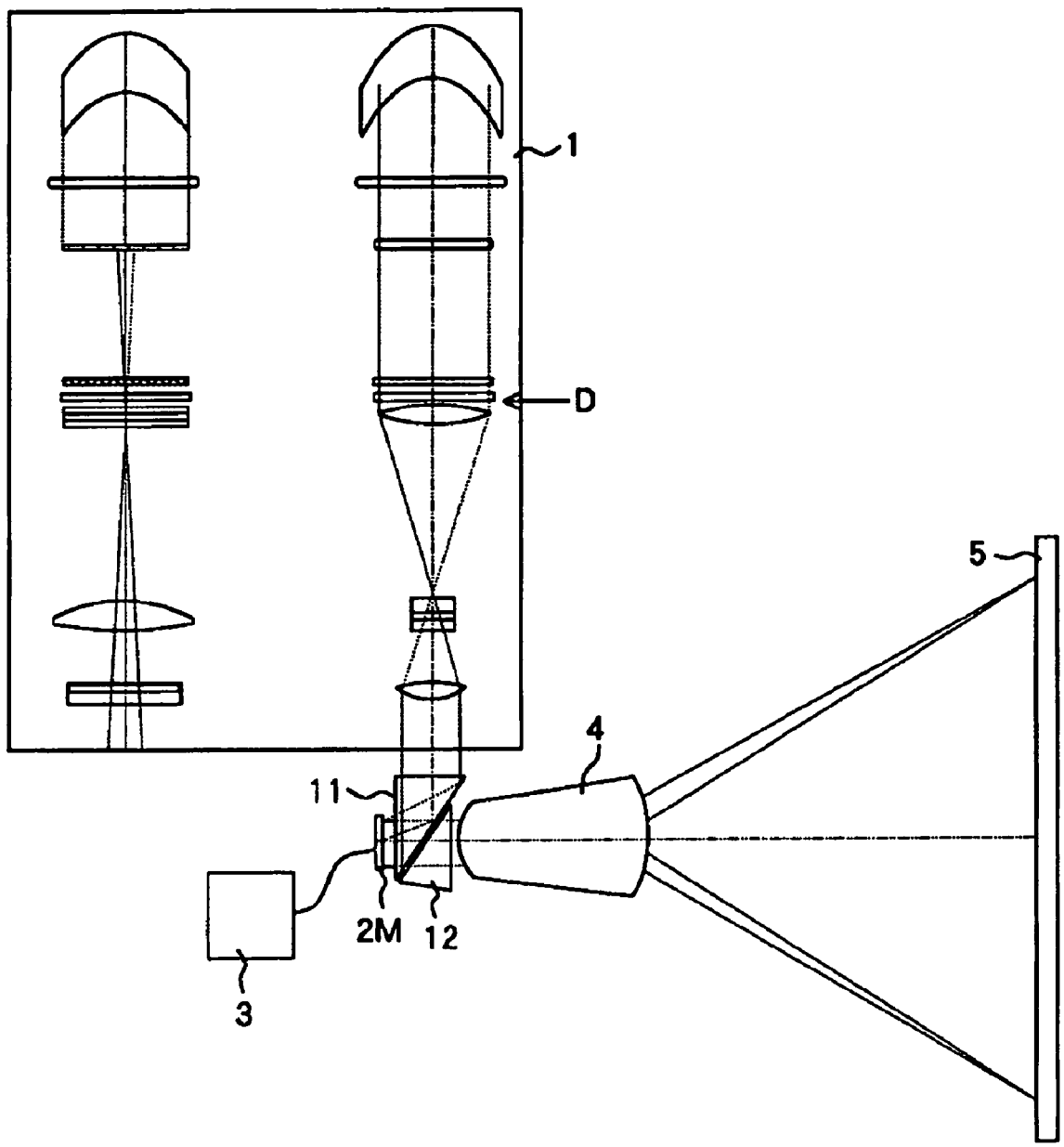
FIG. 13 is a schematic diagram showing the structure of a projection type image display apparatus which is Embodiment 4.

FIG. 13 shows the overall projection display optical system in a projection type image display apparatus which is Embodiment 4 of the present invention.

In FIG. 13, reference numeral 1 schematically shows the illumination optical system described in Embodiments 1 and 2. A representation on the left in the frame in the figure shows the illumination optical system on the right viewed from an arrow D. In Embodiment 4, the illumination optical system 1 does not need to include the polarization conversion element arrays 108 and 208.

Reference numeral 2M shows a mirror array light deflection modulation panel (hereinafter referred to as a mirror modulation panel). Reference numeral 3 shows a light modulation panel driver which converts an external video input signal from an image information supply apparatus such as a personal computer, a television, a VCR, and a DVD player, not shown, into a driving signal for driving the mirror modulation panel 2M. The mirror modulation panel 2M deflects and drives each micromirror pixel corresponding to the driving signal input thereto to deflect and modulate illumination luminous fluxes incident on the mirror modulation panel 2M.

Reference numeral 11 shows a total reflection tilt prism which reflects illumination light from the illumination optical system 1 by a total reflection surface and directs the light to illuminate the mirror modulation panel 2M obliquely to the normal thereof. In this case, the micromirror pixels arranged in the mirror modulation panel 2M are deflected in the plane which includes the normal to the mirror modulation panel 2M and the optical axis of the illumination light.

The illumination light incident on the mirror modulation panel 2M is reflected in a controlled direction in accordance with the modulation state of the micromirror pixels in the mirror modulation panel 2M. Specifically, the light is deflected and modulated to reflect the light to the outside of the pupil area of a projection lens 4 for black modulation, while the light is deflected and modulated to reflect the light into the pupil area of the projection lens 4 for white modulation. In white modulation, the light is deflected to be incident perpendicularly to the total reflection surface of the total reflection tilt prism 11, so that the light is transmitted through the total reflection surface and through a prism 12 for correcting an optical path length disposed with an air gap between them, and then taken by the entrance pupil of the projection lens 4 without any change.

Since the projection lens 4 is arranged to dispose a modulation surface of the mirror modulation panel 2M and a diffusion surface of a light diffusion screen 5 in an optically conjugate relationship, the modulated light is projected onto the light diffusion screen 5 to display an image corresponding to the video signal on the light diffusion screen 5.

As the illumination luminous flux has a smaller convergent angle, the total reflection surface of the total reflection tilt prism 11 can direct the luminous flux closer to be perpendicular to the mirror modulation panel 2M. In addition, as the illumination luminous flux has a smaller convergent angle, modulation can be performed at a smaller deflection angle of the micromirror pixels in the mirror modulation panel 2M. Thus, design can be performed with relaxed limitations on arrangement of the overall optical system in terms of device and with a larger latitude in terms of size. As a result, the entire apparatus can be manufactured with low cost.

Therefore, when the optical integrator implemented by the conventional pair of two-dimensional fly eye lens arrays is used in the illumination optical system, a luminous flux with the incident angle distribution as shown in FIG. 11(A) has an convergent angle, so that the aforementioned advantages are difficult to achieve.

In contrast, the use of the illumination optical system 1 of Embodiments 1 and 2 can provide a luminous flux with the incident angle distribution as shown in FIG. 10(A), thereby allowing the aforementioned advantages.

Embodiment 5

Figure 14:
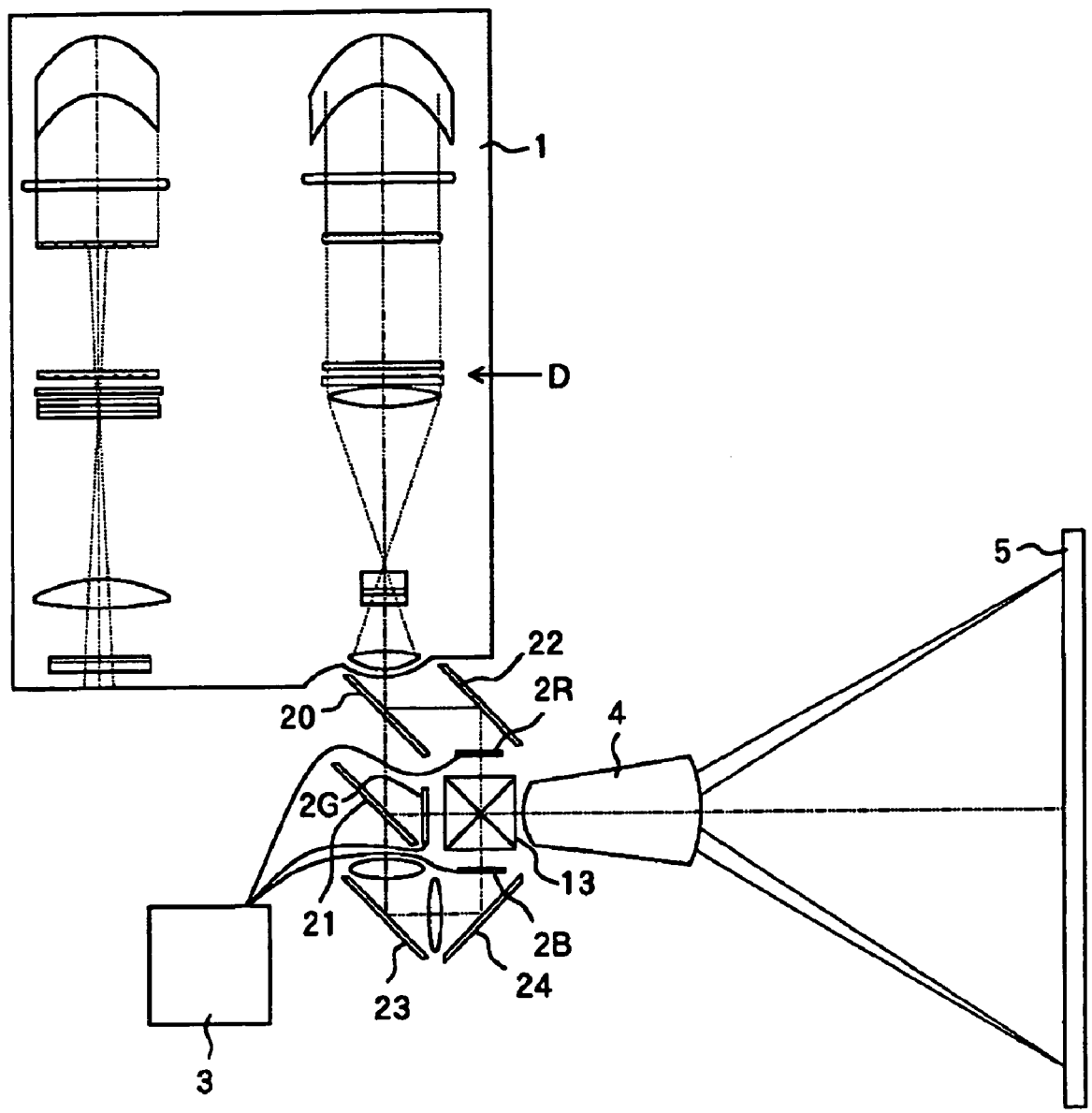
FIG. 14 is a schematic diagram showing the structure of a projection type image display apparatus which is Embodiment 5.

FIG. 14 shows the overall projection display optical system in a projection type image display apparatus which is Embodiment 5 of the present invention.

In FIG. 14, reference numeral 1 schematically shows the illumination optical system described in Embodiments 1 and 2. A representation on the left in the frame in the figure shows the illumination optical system on the right viewed from an arrow D.

Reference numerals 2R, 2G, and 2B show transmission type liquid crystal modulation panels (hereinafter referred to as liquid crystal modulation panels) for read, green, and blue, respectively. Reference numeral 3 shows a light modulation panel driver which converts an external video input signal from an image information supply apparatus such as a personal computer, a television, a VCR, and a DVD player, not shown, into a driving signal for driving the liquid crystal modulation panels 2R, 2G, and 2B. Each of the liquid crystal modulation panels 2R, 2G, and 2B forms an original image with liquid crystal corresponding to the driving signal input thereto to modulate an illumination luminous flux incident on each of the liquid crystal modulation panels 2R, 2G, and 2B.

Reference numeral 20 shows a red splitting dichroic mirror which reflects light components for red and transmits light components for cyan (green and blue), of illumination light as linearly polarized light polarized in a direction orthogonal to the sheet from the illumination optical system 1. The light components for red reflected by the red splitting dichroic mirror 20 are guided to the liquid crystal modulation panel 2R for red by a mirror 22.

On the other hand, of the light components for cyan transmitted through the red splitting dichroic mirror 20, light components for green which corresponds to light components for yellow are reflected by a yellow splitting dichroic mirror 21 and guided to the liquid crystal modulation panel 2G for green.

Light components for blue transmitted through the yellow splitting dichroic mirror 21 are guided to the liquid crystal modulation panel 2B for blue by two mirrors 23 and 24. In the optical path for the blue light components transmitted through the yellow splitting dichroic mirror 21, a cat's-eye optical system formed of Fourier transform lenses 25 and 26 is provided to extend the optical path length to transfer the pupil to the liquid crystal modulation panel 2B for blue.

In this manner, the respective liquid crystal modulation panels 2R, 2G, and 2B are illuminated by the corresponding color light components.

The illumination light components for the respective colors incident on the liquid crystal modulation panels 2R, 2G, and 2B (the linearly polarized light polarized in the direction orthogonal to the sheet) are given phase differences of polarization in accordance with the modulation state of pixels arranged in the liquid crystal modulation panels 2R, 2G, and 2B.

The modulated light emerging from each of the liquid crystal modulation panels 2R, 2G, and 2B is incident on an analyzer (not shown) attached to an incident surface for each color component of a cross dichroic prism 13 serving as a color combination prism. In this case, modulated light components polarized in the direction orthogonal to the sheet are transmitted through the analyzer, while modulated light components polarized in a direction in parallel with the sheet are absorbed by the analyzer and lost as heat.

The modulated light component for each color transmitted through each analyzer (the modulated light component polarized in the direction orthogonal to the sheet) is incident on the cross dichroic prism 13.

The cross dichroic prism 13 is formed by arranging a red reflecting dichroic film and a blue reflecting dichroic film in a cross shape to exert effects on S-polarized light such that the former reflects red light and transmits green light and blue light and the latter reflects blue light and transmits green light and red light.

The cross dichroic prism 13 is used to reflect the image light (the modulated light) for red by the red reflecting dichroic film toward a projection lens 4 and reflect the image light for blue by the blue reflecting dichroic film toward the projection lens 4. The image light for green is transmitted both of the dichroic films and directed toward the projection lens 4.

The liquid crystal modulation panels 2R, 2G, and 2B are adjusted or mechanically or electrically compensated for such that predetermined pixels on the respective panels are relatively superimposed on the light diffusion screen 5 with high accuracy.

The light components for the respective colors combined by the cross dichroic prism 13 are taken by the entrance pupil of the projection lens 4. The projection lens 4 is arranged to dispose a modulation surface of each liquid crystal modulation panel and a diffusion surface of the light diffusion screen 5 in an optically conjugate relationship. Thus, the light components for the respective colors combined by the cross dichroic prism 13 are transferred to the light diffusion screen 5 to project and display an image corresponding to the video signal on the light diffusion screen 5.

As the color combination prism, a 3P (piece) prism or a 4P prism may be used other than the aforementioned cross dichroic prism 13.

Each of the dichroic mirrors 20 and 21 used for illuminating the liquid crystal modulation panels 2R, 2G, and 2B, and the dichroic film disposed in the cross dichroic prism 13 which combines the modulated light components for the respective colors have the characteristic that, as a deviation amount of the incident angle of a ray from 45 degrees with respect to the dichroic film is increased, the splitting wavelength is shifted toward a shorter wavelength at an obtuse angle or toward a longer wavelength at an acute angle.

Thus, when the optical integrator implemented by the conventional pair of two-dimensional fly eye lens arrays is used in the illumination optical system, a luminous flux with the incident angle distribution as shown in FIG. 11(A) is incident on the dichroic film, so that luminous fluxes at different wavelengths coexist as the incident angle is deviated from 45 degrees with respect to the dichroic film. In this case, if the lamp unit has gradual radiation energy wavelength distribution like blackbody radiation, distribution of angles incident on the dichroic film is symmetric about 45 degrees, so that the average cut wavelength is not changed. However, when the lamp unit of electron excited radiation which uses gas exciting light emission is used, it has wavelength spectral distribution including emission lines as dominant parts in radiation energy wavelength distribution, and thus the average cut wavelength is changed with the median point.

Therefore, color combination by the dichroic films is not appropriately achieved to result in poor color reproducibility in a projected image.

For the polarized light modulation characteristics of the liquid crystal modulation panels 2R, 2G, and 2B which are the transmission type liquid crystal modulation elements, when twisted nematic liquid crystal is used as the liquid crystal modulation element, it fundamentally has the characteristic that it cannot accurately provide a phase difference for modulation of polarized light incident on the transmission type liquid crystal at an azimuth of 45 degrees. For this reason, in the optical integrator implemented by the conventional pair of two-dimensional fly eye lens arrays which illuminates light from azimuths generally symmetric with respect to the axis, polarization modulation by the liquid crystal is not sufficient, and intended black display is shown in gray to reduce illuminance contrast.

On the contrary, the illumination optical system 1 of Embodiments 1 and 2 can be used to provide a luminous flux with the incident angle distribution as shown in FIG. 10(A). When the luminous flux is incident on the dichroic film, a deviation amount of the incident angle from 45 degrees with respect to the dichroic film falls within ±3 to 4 degrees. This can almost eliminate inappropriate color combination due to the change in the average cut wavelength with the median point in the dichroic film occurring when the optical integrator implemented by the conventional pair of two-dimensional fly eye lens arrays is used.

For the polarized light modulation characteristics of the respective liquid crystal modulation panels 2R, 2G, and 2B, since almost no components of illumination luminous fluxes are directed from an azimuth at which polarized light modulation by the liquid crystal is not sufficiently achieved, a reduction in illuminance contrast is almost eliminated.

Embodiment 6

Figure 15:
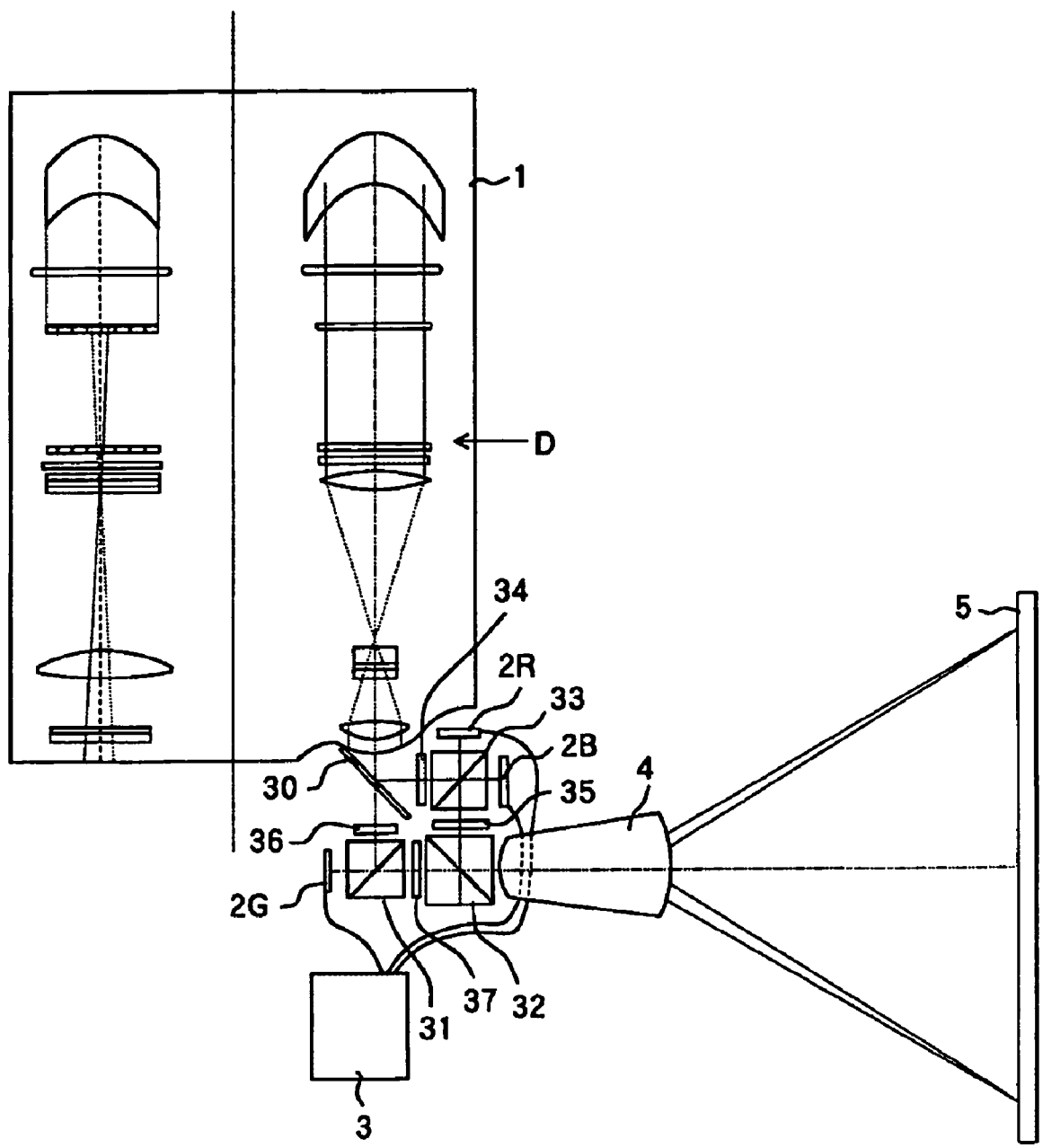
FIG. 15 is a schematic diagram showing the structure of a projection type image display apparatus which is Embodiment 6.

FIG. 15 shows the overall projection display optical system in a projection type image display apparatus which is Embodiment 6 of the present invention.

In FIG. 15, reference numeral 1 schematically shows the illumination optical system described in Embodiments 1 and 2. A representation on the left in the frame in the figure shows the illumination optical system on the right viewed from an arrow D.

Reference numerals 2R, 2G, and 2B show reflection type liquid crystal modulation panels (hereinafter referred to as liquid crystal modulation panels) for read, green, and blue, respectively. Reference numeral 3 shows a light modulation panel driver which converts an external video input signal from an image information supply apparatus such as a personal computer, a television, a VCR, and a DVD player, not shown, into a driving signal for driving the liquid crystal modulation panels 2R, 2G, and 2B. Each of the liquid crystal modulation panels 2R, 2G, and 2B forms an original image with liquid crystal corresponding to the driving signal input thereto to reflect and modulate an illumination luminous flux incident on each of the liquid crystal modulation panels 2R, 2G, and 2B.

Of illumination light as linearly polarized light polarized in a direction orthogonal to the sheet of FIG. 16 from the illumination optical system 1, light components for magenta (red and blue) are reflected by a magenta splitting dichroic mirror 30 which reflects the light components for magenta and transmits light components for green.

The reflected light components for magenta are incident on a blue cross color polarizer 34 which provides a phase difference of π for polarized light for blue. This produces light components for blue which are linearly polarized light polarized in a direction in parallel with the sheet and light components for red which are linearly polarized light polarized in the direction orthogonal to the sheet.

The blue light components and the red light components are incident on a polarization beam splitter 33 in which the blue light components which are P-polarized light are transmitted through a polarization splitting film and guided to the liquid crystal modulation panel 2B for blue. The red light components which are S-polarized light are reflected by the polarization splitting film and guided to the liquid crystal modulation panel 2R for red.

On the other hand, the green light components transmitted through the magenta splitting dichroic mirror 30 are transmitted through a dummy glass 36 for correcting an optical path length and incident on a polarization beam splitter 31.

The green light components which are S-polarized light incident on the polarization beam splitter 31 are reflected by a polarization splitting film of the polarization beam splitter 31 and guided to the liquid crystal modulation panel 2G for green.

In this manner, the respective liquid crystal modulation panels 2R, 2G, and 2B are illuminated by the corresponding color light components.

The illumination light components for the respective colors incident on the liquid crystal modulation panels 2R, 2G, and 2B (the linearly polarized light polarized in the direction orthogonal to the sheet) are given phase differences of polarization in accordance with the modulation state of pixels arranged in the liquid crystal modulation panels 2R, 2G, and 2B.

Of the modulated light emerging from the liquid crystal modulation panels 2R, 2G, and 2B, light components polarized in the same direction as the illumination light return toward the lamp unit along the optical path reversely to the illumination. Light components polarized in a direction orthogonal to the polarization direction of the illumination light reach a projection lens 4 as follows.

Specifically, the light modulated by the liquid crystal modulation panel 2R for red is converted into P-polarized light polarized in the direction in parallel with the sheet and is transmitted through the polarization splitting film of the polarization beam splitter 33. Next, the light is transmitted through a red cross color polarizer 35 which provides a phase difference of π for the polarized light for red, and is converted into light components for red as linearly polarized light polarized in the direction orthogonal to the sheet.

The red light components which have been converted into S-polarized light are incident on a polarization beam splitter 32, reflected by a polarization splitting film thereof, and directed toward the projection lens 4.

The light modulated by the liquid crystal modulation panel 2B for blue is converted into S-polarized light polarized in the direction orthogonal to the sheet and reflected by the polarization splitting film of the polarization beam splitter 33. Then, the light is transmitted through the red cross color polarizer 35 without being subjected to the effect of the polarizer 35 and incident on the polarization beam splitter 32.

The blue light components which are S-polarized light are reflected by the polarization splitting film of the polarization beam splitter 32 and directed toward the projection lens 4.

The light modulated by the liquid crystal modulation panel 2G for green is converted into P-polarized light polarized in the direction in parallel with the sheet and transmitted through the polarization splitting film of the polarization beam splitter 31. The light is transmitted through a dummy glass 37 for correcting an optical path length and incident on the polarization beam splitter 32. The green light components which are P-polarized light are transmitted through the polarization splitting film of the polarization beam splitter 32 and directed toward the projection lens 4.

The liquid crystal modulation panels 2R, 2G, and 2B are adjusted or mechanically or electrically compensated for such that predetermined pixels on the respective panels are relatively superimposed on a light diffusion screen 5 with high accuracy.

The light components for the respective colors combined by the polarization beam splitter 32 are taken by the entrance pupil of the projection lens 4. The projection lens 4 is arranged to dispose a modulation surface of each liquid crystal modulation panel and a diffusion surface of the light diffusion screen 5 in an optically conjugate relationship. Thus, the light components for the respective colors combined by the polarization beam splitter 32 are transferred to the light diffusion screen 5 to project and display an image corresponding to the video signal on the light diffusion screen 5.

The dichroic film of the dichroic mirror 30 used in the optical path for illuminating the liquid crystal modulation panels 2R, 2G, and 2B has the characteristic that, as a deviation amount of the incident angle of a ray from 45 degrees with respect to the dichroic film is increased, the splitting wavelength is shifted toward a shorter wavelength at an obtuse angle or toward a longer wavelength at an acute angle.

Thus, when the optical integrator implemented by the conventional pair of two-dimensional fly eye lens arrays is used in the illumination optical system, a luminous flux with the incident angle distribution as shown in FIG. 11(A) is incident on the dichroic film, so that luminous fluxes at different wavelengths coexist as the incident angle is deviated from 45 degrees with respect to the dichroic film.

If the lamp unit serving as the light source has gradual radiation energy wavelength distribution like blackbody radiation, the distribution of angles incident on the dichroic film is symmetric about 45 degrees, so that the average cut wavelength is not changed. However, when the lamp unit of electron excited radiation which uses gas exciting light emission is used as in Embodiment 6, it has wavelength spectral distribution including emission lines as dominant parts in radiation energy wavelength distribution, and thus the average cut wavelength is changed with the median point. Therefore, color splitting by the dichroic films is not appropriately achieved to result in the disadvantage of unnatural color reproducibility in a projected image.

The polarization beam splitters 31, 32, and 33 used in the optical path for illuminating the liquid crystal modulation panels 2R, 2G, and 2B and the optical path for color combination are typical polarization beam splitters of a MacNeil type, and have the polarization splitting films for S-polarized light and P-polarized light by means of the Brewster angle. As a deviation amount of the incident angle of a ray from 45 degrees with respect to the polarization splitting surface is increased, accuracy of splitting of S-polarized light and P-polarized light is suddenly reduced.

The accuracy of splitting of S-polarized light and P-polarized light can be actually maintained at a ratio of approximately 50:1 when a deviation amount from 45 degrees falls within approximately ±3 degrees. Thus, when the optical integrator implemented by the conventional pair of two-dimensional fly eye lens arrays is used, a luminous flux with the incident angle distribution as shown in FIG. 11(A) is incident on the polarization beam splitters 31 and 32. In addition, the luminous flux is incident on the polarization beam splitters 31, 32, and 33 after the reflection and polarized light modulation by the liquid crystal modulation panels 2R, 2G, and 2B. This produces the disadvantage that, of luminous fluxes with a deviation amount of incident angle of ±3 degrees or more from 45 degrees with respect to the polarization splitting surface, a portion of P-polarized light is reflected, and a portion of S-polarized light is transmitted.

The illumination light incident on each of the liquid crystal modulation panels 2R, 2G, and 2B formed of reflection type liquid crystal display element is given a phase difference of polarization in accordance with the modulation state of pixels arranged in each of the liquid crystal modulation panels 2R, 2G, and 2B. However, even when the liquid crystal modulation panels 2R, 2G, and 2B sends light which is not subjected to a change in phase difference to display black, a luminous flux inclined three degrees or more from 45 degrees with respect to the polarization splitting surface of the polarization beam splitters 31 to 33 includes a portion of P-polarized light which is reflected and a portion of S-polarized light which is transmitted and transferred to the light diffusion screen 5 through the projection lens 4. As a result, the intended black is displayed in gray to reduce illuminance contrast.

For the polarized light modulation characteristics of the liquid crystal modulation panels 2R, 2G, and 2B, when twisted nematic liquid crystal is used in the liquid crystal modulation panels, the liquid crystal modulation panels 2R, 2G, and 2B fundamentally have the characteristic that it cannot accurately modulate light incident on the reflection type liquid crystal modulation panels at an azimuth of 45 degrees. For this reason, in the optical integrator implemented by the conventional pair of two-dimensional fly eye lens arrays which illuminates light from azimuths generally symmetric with respect to the axis, polarization modulation of the liquid crystal is not sufficient, and intended black display is shown in gray to reduce illuminance contrast, similarly to the incident angle dependency characteristics of the polarization beam splitters 31 to 33 described above.

To address these disadvantages, the illumination optical system 1 of Embodiments 6 can be used to provide a luminous flux with the incident angle distribution as shown in FIG. 10(A). When the luminous flux is incident on the dichroic mirror 30, a deviation amount of the incident angle from 45 degrees with respect to the dichroic film falls within ±3 to 4 degrees. This can almost eliminate inappropriate color combination in the color splitting by the dichroic film due to the change in the average cut wavelength with the median point to result in poor color reproducibility in a projected image occurring when the optical integrator implemented by the conventional pair of two-dimensional fly eye lens arrays is used.

When the luminous flux is incident on the polarization beam splitter 31 to 33, a deviation amount of the incident angle from 45 degrees with respect to each polarization splitting surface falls within ±3 to 4 degrees. This can almost eliminate a reduction in illuminance contrast due to the polarization splitting error which means that polarization splitting does not match the modulation state of the pixels in the liquid crystal modulation panel occurring when the optical integrator implemented by the conventional pair of two-dimensional fly eye lens arrays is used.

For the disadvantage in providing the phase difference for the modulation of polarized light depending on the incident angle on the reflection type liquid crystal modulation panel, since almost no components of illumination luminous fluxes are directed from an azimuth at which polarized light modulation by the liquid crystal is not sufficiently achieved, a reduction in illuminance contrast can be almost eliminated.

The projection type image display apparatus of Embodiments 3 to 6 also provides an advantage in the projection lens 4. Specifically, when the polarization splitting direction or the wavelength splitting direction is set to the long side direction of the liquid crystal modulation panel, it is possible to set the horizontal direction with narrow illumination angle distribution shown in FIG. 10(A) to the direction in which the projection lens 4 has a large projection field angle. This can reduce the width of a luminous flux transmitted in a direction in which an aperture eclipse of the projection lens 4 called vignetting occurs. In other words, the advantage produces the effect of reducing vignetting due to the pupil aperture eclipse of the projection lens 4 to prevent a reduction in light amount at the edge of an image area projected on the light diffusion screen 5, thereby producing a projected image of uniform light intensity distribution.

It should be noted that, while Embodiments 4 to 6 descried above employ the reflection type screen to form the image display system, the screen may be of the reflection type or a transmission type. Specifically, when a screen with predetermined diffusion is used, a projection type image display apparatus can function to allow a user to directly view the screen 5 to recognize an image.

As described above, according to Embodiments 1 to 6, it is possible to realize an illumination optical system which can use light from a light source with high efficiency and provide an illumination luminous flux with high uniform illuminance.

The illumination optical system can be used as an illumination section of a projection display optical system to realize a projection display optical system and a projection type image display apparatus which can provide a projected image with a higher brightness and a high contrast.

While preferred embodiments have been described, it is to be understood that modification and variation of the present invention may be made without departing from scope of the following claims.

What is claimed is:

1. A projection display optical system comprising:
an illumination optical system which illuminates an illumination surface with a generally telecentric illumination luminous flux, the illumination optical system comprising at least one optical element, wherein light intensity distribution of the illumination luminous flux on the illumination surface changes depending on a deviation angle of an incident ray with respect to a normal to the illumination surface, and wherein the optical element optically operates the illumination luminous flux such that a ratio of angle widths at which light intensity reaches half of a peak value in each of two axis directions orthogonal to each other on the illumination surface is an aspect ratio of 2:1 or higher;
a spatial light modulation element which modulates a luminous flux emerging from the illumination optical system by a group of pixels arranged two-dimensionally;
a projection lens which projects the luminous flux modulated by the spatial light modulation element onto a projection surface;
a plurality of transmission type liquid crystal modulation elements as the spatial light modulation element; and
one of a wavelength selective deviating element and a polarization direction selective deviating element which combines luminous fluxes modulated by the respective transmission type liquid crystal modulation elements and is disposed in an optical path from the plurality of transmission type liquid crystal modulation elements to the projection lens,
wherein a direction perpendicular to a direction in a deviating surface by the deviating element matches a direction in which an angle width at which light intensity reaches half of a peak value in the light intensity distribution is larger, of two axis directions orthogonal to each other on the illumination surface.

2. A projection display optical system comprising:
an illumination optical system which optically operates an illumination luminous flux incident as a generally collimated luminous flux, the illumination optical system comprising an optical integrator which performs splitting and recombination on the illumination luminous flux in a first axis direction on a section generally orthogonal to a traveling direction of the illumination luminous flux, and a light intensity conversion element which performs conversion of light intensity distribution of the illumination luminous flux in a second axis direction orthogonal to the first axis direction on the section;
a spatial light modulation element which modulates a luminous flux emerging from the illumination optical system by a group of pixels arranged two-dimensionally;
a projection lens which projects the luminous flux modulated by the spatial light modulation element onto a projection surface;
a plurality of transmission type liquid crystal modulation elements as the spatial light modulation element; and
one of a wavelength selective deviating element and a polarization direction selective deviating element which combine luminous fluxes modulated by the respective transmission type liquid crystal modulation elements and is disposed in an optical path from the plurality of transmission type liquid crystal modulation elements to the projection lens,
wherein a direction perpendicular to a direction in a deviating surface of the deviating element matches a direction in which the optical integrator performs the splitting and recombination.

3. A projection type image display apparatus comprising:
a light source which emits an illumination luminous flux; and
the projection display optical system according to claim 1.

4. An image display system comprising:
the projection type image display apparatus according to claim 3; and
a screen which forms the projection surface,
wherein the screen allows observation of a projected image with one of divergent reflection light and divergent transmission light having predetermined directivity.

5. A projection type image display apparatus comprising:
a light source which emits an illumination luminous flux; and
the projection display optical system according to claim 2.

6. An image display system comprising:
the projection type image display apparatus according to claim 5; and
a screen which forms the projection surface,
wherein the screen allows observation of a projected image with one of divergent reflection light and divergent transmission light having predetermined directivity.

* * * * *